US011765783B2

(12) United States Patent
Lindheimer et al.

(10) Patent No.: US 11,765,783 B2
(45) Date of Patent: *Sep. 19, 2023

(54) INDICATING RAN NOTIFICATION AREA UPDATE (RNAU) IN RRC_INACTIVE STATE

(71) Applicant: Telefonaktiebolaget LM Ericsson (publ), Stockholm (SE)

(72) Inventors: Christofer Lindheimer, Linköping (SE); Icaro L. J. Da Silva, Solna (SE); Gunnar Mildh, Sollentuna (SE); Paul Schliwa-Bertling, Ljungsbro (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/526,255

(22) Filed: Nov. 15, 2021

(65) Prior Publication Data
US 2022/0078876 A1 Mar. 10, 2022

Related U.S. Application Data

(63) Continuation of application No. 16/338,867, filed as application No. PCT/SE2019/050110 on Feb. 11, 2019, now Pat. No. 11,219,084.
(Continued)

(51) Int. Cl.
*H04W 76/27* (2018.01)
*H04W 76/19* (2018.01)
(Continued)

(52) U.S. Cl.
CPC .......... *H04W 76/27* (2018.02); *H04W 60/04* (2013.01); *H04W 68/08* (2013.01);
(Continued)

(58) Field of Classification Search
CPC ..... H04W 76/27; H04W 60/04; H04W 68/08; H04W 74/002; H04W 76/19; H04W 76/28
See application file for complete search history.

(56) References Cited

U.S. PATENT DOCUMENTS

| 2013/0039287 A1 | 2/2013 | Rayavarapu et al. |
| 2013/0039339 A1 | 2/2013 | Rayavarapu et al. |

(Continued)

FOREIGN PATENT DOCUMENTS

| CN | 103858512 A | 6/2014 |
| CN | 103858513 A | 6/2014 |

(Continued)

OTHER PUBLICATIONS

"CN area updating in RRC_Inactive", 3GPP TSG-RAN WG2 #100 Tdoc; R2-1713297; Reno, Nevada, Nov. 27-Dec. 1, 2017, pp. 1-5.
(Continued)

*Primary Examiner* — Deepa Belur
(74) *Attorney, Agent, or Firm* — Murphy, Bilak & Homiller, PLLC

(57) ABSTRACT

Embodiments include methods in a wireless device. Such methods include, while the wireless device is in a Radio Resource Control (RRC) inactive state with respect to a wireless communication network, determining that a Radio Access Network Notification Area Update (RNAU) is needed. Such methods include evaluating whether there is any cause, other than the determined need for the RNAU, for resuming an RRC connected state with the wireless communication network and transmitting, to the wireless communication network, an RRC Resume Request message comprising a cause indicator indicating a cause for resuming the RRC connected state. The cause indicator indicates an RNAU when there is no cause for resuming the RRC connected state other than the determined need for the
(Continued)

RNAU and otherwise indicates a cause other than an RNAU. Other embodiments include wireless devices configured to perform such methods and computer-readable media that store instructions embodying such methods.

12 Claims, 27 Drawing Sheets

Related U.S. Application Data

(60) Provisional application No. 62/630,656, filed on Feb. 14, 2018.

(51) Int. Cl.
*H04W 76/28* (2018.01)
*H04W 60/04* (2009.01)
*H04W 68/08* (2009.01)
*H04W 74/00* (2009.01)

(52) U.S. Cl.
CPC ......... *H04W 74/002* (2013.01); *H04W 76/19* (2018.02); *H04W 76/28* (2018.02)

(56) References Cited

U.S. PATENT DOCUMENTS

| | | | |
|---|---|---|---|
| 2014/0233408 A1 | 8/2014 | Bontu et al. | |
| 2016/0309379 A1 | 10/2016 | Pelletier et al. | |
| 2017/0332372 A1* | 11/2017 | Lee | H04W 72/542 |
| 2018/0054796 A1 | 2/2018 | Edge | |
| 2018/0176962 A1* | 6/2018 | Wu | H04W 74/0833 |
| 2018/0220486 A1 | 8/2018 | Tseng et al. | |
| 2018/0234941 A1* | 8/2018 | Kim | H04W 68/005 |
| 2018/0368018 A1 | 12/2018 | Kim et al. | |
| 2018/0376524 A1* | 12/2018 | Lee | H04W 76/19 |
| 2019/0045481 A1 | 2/2019 | Sang et al. | |
| 2019/0215798 A1 | 7/2019 | Kim et al. | |
| 2019/0320476 A1 | 10/2019 | Wang et al. | |
| 2020/0059884 A1 | 2/2020 | Chen et al. | |
| 2020/0068646 A1 | 2/2020 | Kwon | |
| 2020/0120476 A1 | 4/2020 | Lee et al. | |
| 2020/0178204 A1* | 6/2020 | Chen | H04W 60/00 |
| 2020/0275512 A1 | 8/2020 | Wu et al. | |
| 2020/0288425 A1* | 9/2020 | Jiang | H04W 36/32 |

FOREIGN PATENT DOCUMENTS

| | | | | |
|---|---|---|---|---|
| CN | 106879009 A | 6/2017 | | |
| RU | 2628700 C2 | 8/2017 | | |
| WO | 2013006384 A1 | 1/2013 | | |
| WO | 2013144606 A1 | 10/2013 | | |
| WO | 2017123048 A1 | 7/2017 | | |
| WO | WO-2017123048 A1 * | 7/2017 | ............ | H04W 76/10 |
| WO | WO-2017126922 A1 * | 7/2017 | ............ | H04W 76/10 |
| WO | 2017184842 A1 | 10/2017 | | |

OTHER PUBLICATIONS

"3GPP TS 23.122 V15.2.0", 3rd Generation Partnership Project; Technical Specification Group Core Network and Terminals; Non-Access-Stratum (NAS) functions related to Mobile Station (MS) in idle mode (Release 15), Dec. 2017, pp. 1-54.
"3GPP TS 38.331 V15.0.0", 3rd Generation Partnership Project; Technical Specification Group Radio Access Network NR Radio Resource Control (RRC) protocol specification (Release 15), Dec. 2017, pp. 1-188.
"3GPP TS 38.304 V0.0.7". 3rd Generation Partnership Project; Technical Specification Group Radio Access Network; New Generation Radio Access Network; User Equipment (UE) procedures in Idle mode (Release 15), Jan. 2018, pp. 1-12.
"3GPP TS 23.502 V15.0.0", 3rd Generation Partnership Project; Technical Specification Group Services and System Aspects; Procedures for the 5G System; Stage 2 (Release 15), Dec. 2017, pp. 1-258.
"3GPP TS 23.501 V15.0.0", 3rd Generation Partnership Project; Technical Specification Group Services and System Aspects; System Architecture for the 5G System; Stage 2 (Release 15), Dec. 2017, pp. 1-181.
"CN area updating in RRC_Inactive", 3GPP TSG-RAN WG2 #101, Tdoc R2-1802376, Athens, Greece, Feb. 26-Mar. 2, 2018, pp. 1-6.
"CN area updating in RRC_Inactive", 3GPP TSG-RAN WG2 #NR AH1801 Tdoc R2-1800435, Vancouver, Canada, Jan. 22-26, 2018, pp. 1-5.
"Discussion on CN location Update and RNA Update for inactive state", Huawei, HiSilicon, 3GPP TSG-RAN WG2#99bis Meeting, R2-1710582, Prague, Czech Republic, Oct. 9-13, 2017, pp. 1-3.
"RAN Area update in RRC_Inactive", 3GPP TSG-RAN WG2 #100, Tdoe R2-1713296, Reno, Nevada, USA,, Nov. 27-Dec. 1, 2017, pp. 1-4.

* cited by examiner

INDICATING RAN NOTIFICATION AREA UPDATE (RNAU) IN RRC_INACTIVE STATE

CROSS-REFERENCE TO RELATED APPLICATION(S)

This application is a continuation of and claims the benefit of priority from U.S. patent application Ser. No. 16/338,867 filed on Apr. 2, 2019, which is a U.S. national-stage entry of international application PCT/SE2019/050110 filed on Feb. 11, 2019, which claims the benefit of priority from U.S. Provisional Patent Application 62/630,656 filed Feb. 14, 2018. The entire disclosures of the above-mentioned applications are incorporated herein by reference for all purposes.

TECHNICAL FIELD

The present application is generally related to wireless communication networks and is more particularly related to techniques for performing a TA update while in RRC_INACTIVE.

BACKGROUND

The $3^{rd}$-Generation Partnership Project (3GPP) is continuing its efforts to develop specifications for the $5^{th}$-generation wireless communications technology commonly referred to as 5G. In the new 5GS standard, the system and architecture standard for 5G, various state machines are introduced to make sure that a user equipment (UE) is reachable.

One such state machine is the connection management state model, or the CM-state model, described in 3GPP TS 23.501. Generally, Connection management (CM) comprises functions for establishing and releasing a signaling connection between the UE and the AMF (Access and Mobility Management Function).

FIG. 1 illustrates an example of a 5G system architecture, including nodes such as AMF, UE, radio access network (RAN) and interface names. Connection management is about signaling connection over the N1 interface illustrated in FIG. 1.

This signaling connection over N1 is used to enable Non-Access-Stratum (NAS) signaling exchange between the UE and the core network. It comprises both the AN (Access Node) signaling connection between the UE and the AN and the N2 connection, between the AN and the AMF.

There are two CM-states defined, CM-IDLE and CM-CONNECTED. A UE in CM-IDLE has no NAS signaling connection established over N1 to the AMF, and in this CM-state, the UE performs cell selection/reselection and public land mobile network (PLMN) selection. In addition, there is no AN signaling connection or N2/N3 connections for a UE in idle state. If the UE is registered to the network and in CM-IDLE, it shall usually listen to and respond to paging messages from the network. This means that in CM-IDLE the UE is still reachable. If initiated by a user/UE, the UE shall also be able to perform a service request procedure.

A UE in CM-CONNECTED is a UE that has established an AN signaling connection between the UE and the AN. The UE has entered RRC_CONNECTED state over 3GPP access. Over this connection, the UE can transmit an initial NAS message (such as a service request) and this message initiates the transition from CM-IDLE to CM CONNECTED in the AMF. From FIG. 1, it is also realized that for CM-CONNECTED to be entered, there is also a need to establish an N2 connection, between the AN and the AMF. The reception of an initial N2 message (e.g., N2 Initial UE message) initiates the transition for AMF from CM-IDLE to CM-CONNECTED state.

In the CM-CONNECTED state, the UE can transmit data, and it shall be ready to enter CM-IDLE, whenever the AN signaling connection is released. The AMF enters CM-IDLE whenever the logical N1 signaling connection and the N3 user plane connection are released. The AN signaling connection and release for CM are shown in FIG. 2. The N2 Context establishment and release for CM are shown in FIG. 3.

In a similar way as in the AMF, there is also a state model in the AN, the access network. Herefrom, we will use the term "gNB" for the access network node, but it may equally well be another node type, e.g., an ng-eNB, an eNB. The term "gNB" shall thus be considered an example, rather than a limitation in the applicability of the present invention. One state model in the gNB is the RRC State machine.

A UE can either be in RRC_CONNECTED, RRC_INACTIVE and RRC_IDLE. The mapping between the different state machines, the one in the AN and the one in AMF, is such that CM-CONNECTED can map to either RRC_CONNECTED or RRC_INACTIVE—while CM-IDLE always map to RRC_IDLE.

A UE is either in RRC_CONNECTED state or in RRC_INACTIVE state when an RRC connection has been established. If this is not the case, i.e. no RRC connection is established, the UE is in RRC_IDLE state. These different states are further described in 3GPP TS 38.331.

In RRC_IDLE, the UE is configured to listen to a paging channel at certain occasions and it performs cell (re)selection procedures and listen to system information. In RRC_INACTIVE, the UE is also listening to paging channel and does cell (re)selection procedures, but in addition, it also maintains a configuration and the configuration is also kept on the network side, such that, when needed, e.g., when data arrives to the UE, it does not require a complete setup procedure to start transmitting data.

In RRC_CONNECTED, there is transfer of data to or from the UE and the network controls the mobility. This means that the network controls when the UE should handover to other cells. In connected, the UE still monitors the paging channel and it monitors control channels that are associated with whether there is data for the UE or not. It provides channel quality and feedback information to the network and it performs neighboring cell measurement and reports these measurements to the network.

When a UE is in CM-CONNECTED and RRC_INACTIVE the following applies: the UE reachability is managed by the RAN, with assistance information from core network; the UE paging is managed by the RAN; and the UE monitors for paging with UE's CN (5G S-TMSI) and a RAN identifier (I-RNTI).

The AMF, based on network configuration may provide assistance information to the NG-RAN, to assist the NG-RAN's decision whether the UE can be sent to RRC Inactive state. The "RRC Inactive assistance information" can for example include: UE specific DRX values; the Registration Area provided to the UE, sometimes referred to as TAI-list (TrackingAreaIdentifier List) below; Periodic Registration Update timer; If the AMF has enabled MICO mode for the UE, an indication that the UE is in MICO mode; and/or Information from the UE permanent identifier, as defined in TS 38.304 [50], that allows the RAN to calculate the UE's RAN paging occasions.

The RRC Inactive assistance information mentioned above is provided by the AMF during N2 activation with the (new) serving NG-RAN node (i.e. during Registration, Service Request, handover) to assist the NG RAN's decision whether the UE can be sent to RRC Inactive state. RRC Inactive state is part of RRC state machine, and it is up to the RAN to determine the conditions to enter RRC Inactive state. If any of the parameters included in the RRC Inactive Assistance Information changes as the result of NAS procedure, the AMF shall update the RRC Inactive Assistance Information to the NG-RAN node.

The state of the N2 and N3 reference points are not changed by the UE entering CM-CONNECTED with RRC Inactive state. A UE in RRC inactive state is aware of the RAN Notification area (RNA). A UE in the RRC_INACTIVE state can be configured with an RNA, where: the RNA can cover a single or multiple cells, and can be smaller than CN Registration area; a RAN-based notification area update (RNAU) is periodically sent by the UE and is also sent when the cell reselection procedure of the UE selects a cell that does not belong to the configured RNA.

There are several different alternatives on how the RNA can be configured: list of cells; list of RAN areas; and/or list of Tracking Area Identifiers (TAIs). With regard to a list of cells: a UE is provided an explicit list of cells (one or more) that constitute the RNA. With regard to a list of RAN areas: a UE is provided (at least one) RAN area ID, where a RAN area is a subset of a CN Tracking Area; and/or a cell broadcasts (at least one) RAN area ID in the system information so that a UE knows which area the cell belongs to.

In CM-IDLE, it is the core network that is in charge of UE reachability and the core network does this through configuring a CN registration area that is defined by a set of Tracking Areas (TA)'s. The UE is configured with the CN registration area through a list of Tracking Area Identifiers, TAI's, and this CN Registration area is hereafter referred to as "TAI-list".

At transition into CM-CONNECTED with RRC Inactive state, the NG-RAN configures the UE with a periodic RAN Notification Area Update timer taking into account the value of the Periodic Registration Update timer value indicated in the RRC Inactive Assistance Information and uses a guard timer with a value longer than the RAN Notification Area Update timer value provided to the UE. If the periodic RAN Notification Area Update guard timer expires in RAN, the RAN shall initiate AN Release procedure as specified in TS 23.502.

When the UE is in CM-CONNECTED with RRC inactive state, the UE performs PLMN selection procedures as defined in TS 23.122 for CM-IDLE. When the UE is CM-CONNECTED with RRC Inactive state, the UE may resume the RRC connection due to: uplink data pending; mobile initiated NAS signalling procedure; as a response to RAN paging; Notifying the network that it has left the RAN Notification area; and/or upon periodic RAN update timer expiration.

In LTE, a UE performs a TAU triggered by mobility, such as when the UE, upon performing cell reselection, detects a tracking area that is not in the list of tracking areas that the UE previously registered in the mobility management entity (MME).

It should be noted that in the description of this invention, we use TAU-Tracking Area Update and CN Registration Area update, interchangeably. If there is any use of one or the other that is specifically not corresponding to the other, this will be explicitly stated.

The TAU procedure is then triggered by the NAS layer in the UE, and begin with the transmission of a "TAU request" message from the NAS layer in the UE to the MME. In RRC_IDLE, the UE must first connect to the RAN before it can transmit the NAS message to the MME, which is done with a RRCConnectionRequest message with a causeValue equal to "mo-signaling". This will trigger a temporary RRC connection to be setup. In most cases, the UE or the network has no data to send, meaning that the network will move the UE to RRC_IDLE as soon as possible. When the CN is finished with the TAU, it releases the CN/RAN connection which triggers the eNB to send a RRCConnectionRelease message after the "TAU Accept" NAS message has been sent to the UE. In case the UE has UL data to send in conjunction with the TAU, the "TAU Request" NAS message will have a flag indicating this. Similarly, if the network has DL data or control signalling waiting for the UE the CN can trigger a UE context setup in the RAN so that the RAN can establish security and data radio bearers towards the UE.

FIG. 4 shows a timing diagram of a possible Tracking Area Update procedure in RRC_IDLE for a UE in NR, based on TAU procedure from LTE. For a UE in RRC_INACTIVE in a 5G system, and for the radio access known as NG-RAN (Next Generation RAN), it has been agreed that the UE will also perform TAUs when entering a new TA (i.e., a TA that is not part of the UE registered TA-list) and that should be performed using RRC signaling. Hence, to send the TAU to the 5G-CN, the UE should submit the message to its AS layer. When the RRC layer in a UE in RRC_INACTIVE receives the NAS "TAU request" message, it will need to connect to the network and that should be done using a RRCConnectionResumeRequest message.

As with LTE, in most of the cases there will be no data transmission/reception and the network should not keep the UE in RRC_CONNECTED. Hence, to allow that, the RRCConnectionResumeRequest should indicate to the RAN that this message was triggered due to a NAS request. To indicate that the resumption is only for NAS signalling, a cause value corresponding to "mo-signaling" should be set in the RRCConnectionResumeRequest message.

If the network can retrieve the UE AS context, it can respond with a RRCConnectionResume message and the UE will send the "TAU Request" piggybacked in the RRCConnectionResumeComplete message. As the CN/RAN connection is maintained in RRC_INACTIVE, it will first have to be relocated before the NAS message can be forwarded to the CN. And when the CN is finished with the TAU, it sends a "TAU Accept" NAS message to the UE as can be seen in FIG. 5A.

As the UE performs TAU in RRC_INACTIVE when it detects that it enters a new (unregistered) Tracking Area, the UE Context retrieval may fail occasionally. For instance, if a UE with long DRX cycles moves far away from the source gNB, there may not be a Xn connection between the target and the source gNB. In any case, the TAU procedure from RRC_INACTIVE must be able to handle the case when the stored UE context cannot be retrieved.

If the context cannot be successfully retrieved, the gNB will respond to an RRCConnectionResumeRequest indicating mo-signaling with an RRCConnectionSetup to build a new UE context. FIG. 5B shows a Tracking Area Update by a UE in RRC_INACTIVE with a failed UE Context retrieval.

As can be noted from FIGS. 5A and 5B, once the CN is finished with the TAU and has transmitted the "TAU Accept" NAS message to the UE, the gNB has to await the expiration of an inactivity timer before it can suspend the UE again. This is because the NAS messages are transparent to the RAN and since the CN/RAN connection is kept, neither the AS in the gNB nor in the UE will be aware that the CN is finished with the TAU.

An alternative to use of a timer estimating end of TAU would be that AMF send an indication to gNB that a TAU is finalized. This way, an inactivity timer would not be needed for this purpose.

When the UE is in RRC_INACTIVE, hence in CM-Connected, it does still perform CN Registration Area updates due to mobility and in particular, this is needed if a UE is moving to a cell that is not belonging to any of the tracking areas in the TAI list.

At the same time as the UE moves/reselects to such a cell, it may also move outside any RNA, as the allowed RNA can only include cells that are part of the TA's of the TAI list.

Thus, it is recognized herein that there can be a situation for UE's in RRC_INACTVE where both the AS and the NAS triggers an update need.

NAS triggers a Tracking area update need. AS triggers an RNA update need due to mobility, since the UE has left its configured RNA. The problem is then the potential for the UE to trigger both, after each other.

SUMMARY

Embodiments of the present invention help the network to avoid unnecessarily bringing a UE to RRC_CONNECTED and provide a solution that avoids any "double procedures" where the UE triggers both RNAU and TAU.

Another aspect of the embodiments includes a procedure in the UE and in the network to coordinate area information on the UE side and on the network side. If there should be any discrepancy in information between the UE and the network, this is caught by the procedures of the embodiments.

In one aspect of the present invention, from the UE perspective, a UE is configured to perform RNA updates and tracking area updates, when crossing the border of a tracking area list (and at the same time crossing the RNA list border, as these borders are overlapping). The UE triggers first an RNA update. For example, the UE sends an RRC Resume Request with a cause value associated to the RNA update (e.g. 'rna-update') and waits for an RRC Resume message. And, upon receiving the RRC Resume message, the UE moves to RRC_CONNECTED and sends RRC Resume complete multiplexed with the Tracking Area Update NAS message.

Notice that there will be cases where the UE only crosses an RNA and remains in the same TA or the same TA list. In these cases, the UE sends the Resume Request and simply waits for a Suspend message. In view of the discussion below, it will be appreciated that this allows the network to use an optimized procedure where the UE is immediately suspended to RRC Inactive state, e.g., when the network has determined for itself that no tracking area update (TAU) is necessary, or when the network simply wants to force a separate TAU procedure, if a TAU is necessary. In the suspend message, the UE can be assigned a new I-RNTI (resume ID) and a new RNA, in some embodiments.

Note that for the purposes of the present discussion, the terms "RRC Resume Request" and "Resume Request" are interchangeable. The person skilled in the art will appreciate that other terms, such as RRCConnectionResumeRequest, might also be used to refer to this same or to a similar message.

According to some embodiments, a method in a wireless device operating in a wireless communication network includes determining, while in a Radio Resource Control (RRC) Inactive state, that both a Radio Access Network Notification Area Update (RNAU) and a tracking area update (TAU) are needed. The method also includes transmitting a RRC Resume Request message to the network, in response to the determining. The RRC Resume Request message includes a cause indicator indicating only an RNAU as a cause for resuming a RRC Connected state.

According to some variant embodiments, a method in a wireless device operating in a wireless communication network includes determining, while in an RRC Inactive state, that an RNAU is needed. The method also includes transmitting a RRC Resume Request message to the network, in response to the determining. The RRC Resume Request message is a cause indicator indicating only an RNAU as a cause for resuming a RRC Connected state. The method also includes receiving a RRC Resume message in response to the RRC Resume Request and initiating a TAU in response to receiving the RRC Resume Request, without regard to whether NAS functionality in the wireless device has determined a need for a TAU.

According to some variant embodiments, a method in a wireless device operating in a wireless communication network includes determining, while in an RRC Inactive state, that both a RNAU and a TAU are needed. The method includes transmitting an RRC Resume Request message to the network, in response to the determining. The RRC Resume Request message includes a cause indicator indicating only a mobility signaling as a cause for resuming a RRC Connected state. The method further includes receiving a RRC Resume message in response to the RRC Resume Request and initiating a tracking area update (TAU) in response to receiving the RRC Resume Request.

According to some variant embodiments, a method in a wireless device operating in a wireless communication network includes determining, while in an RRC Inactive state, that an RNAU is needed. The method includes evaluating whether there is any other cause for resuming a RRC connected state, in addition to the need for the RNAU and transmitting a RRC Resume Request message to the network, in response to the determining. The RRC Resume Request message includes a cause indicator, where the cause indicator indicates a RNAU only in the event that said evaluating identifies no other cause for resuming the RRC connected state.

From the network perspective, when a gNB receives an RRC Resume request message from a UE including an indication of RAN Notification Area Update (RNAU), the network fetches the context of that UE, and if the context fetch is successful, the gNB checks whether the cell the UE is currently accessing through belongs to a TA that is represented in the TAI list that is received in the RRC Inactive Assistance information and stored with the UE context. If there is a mismatch and the currently serving cells does not belong to any of the listed TA's, the gNB responds to the RNAU resume request with a Resume message and transition the UE to RRC_CONNECTED so that according to the UE method described in the first paragraph the UE sends a Tracking Area Update (TAU) Request multiplexed with the RRC Resume Complete message. If there is not a mismatch, on the other hand, the gNB may instead respond immediately with a RRC Suspend message, e.g., if there is no downlink data buffered for the UE, thus avoiding that the UE is transitioned to RRC Connected state.

Note that for the purposes of the present discussion, the terms "RRC Resume" and "Resume" are interchangeable, when used in connection with a message. The person skilled in the art will appreciate that other terms, such as RRCConnectionResume, might also be used to refer to this same or to a similar message. Likewise, the terms "RRC Resume Complete" and "Resume Complete" are interchangeable, when used in connection with a message, and the person skilled in the art will appreciate that other terms, such as RRCConnectionResumeComplete, might also be used to refer to this same or to a similar message.

According to some embodiments, a method, in an access network node of a wireless communication system, includes receiving, from a wireless device, a RRC Resume Request message. The RRC Resume Request message includes a cause indicator indicating only an RNAU as a cause for resuming a RRC Connected state. The method also includes retrieving a context for the wireless device and determining, based on the context, whether a tracking area code (TAC) of the cell receiving the RRC Resume Request is represented in a tracking area identifier (TAI) list for the wireless device. The method further includes selectively responding to the RRC Resume Request message with either a RRC Resume message, in the event that the TAC is not represented in the TAI list, or a RRC Suspend message, in the event that the TAC is represented in the TAI list.

According to some variant embodiments, a method, in an access network node of a wireless communication system, includes receiving, from a wireless device, a RRC Resume Request message, said RRC Resume Request message comprising a cause indicator indicating only a mobility signaling as a cause for resuming a RRC Connected state. The method also includes retrieving a context for the wireless device and respond to the RRC Resume Request message with a RRC Resume message. The method further includes receiving, in response to the RCC Resume message, an RRC Resume Complete message, the RRC Resume Complete message comprising or being combined with a TAU message.

In another aspect of the present invention, when the UE receives an RRC Resume message in response to an RRC Resume Request with cause value indicating RAN Area update, it shall always do a tracking area update procedure. This may be initiated through inclusion of a NAS TAU indication in message 5. Message 5 is usually a complete message sent by the UE to the network. E.g. RRC Resume Complete. In case the UE is suspended in MSG4 (network does not send Resume) the UE most likely does not need to send MSG5. But if the UE is Resumed it would send message 5. Message 5 could piggyback a NAS messages such as UE registration update. In this aspect, Tthe tracking area update shall be done irrespectively of if whether the NAS in the UE has identified the need of for a tracking area update procedure.

In a first variant of the previous method, from the UE perspective, the UE sends an RRC Resume Request with a cause value associated to the RNA update (e.g. 'rna-update') but either waits for an RRC Resume message or for an RRC message suspending the UE (e.g. release message with suspend indication). If the UE receives an RRC Resume message it acts as described in the first paragraph, else, if it receives an RRC message suspending the UE (e.g. release with a suspend indication) the UE then goes to RRC_INACTIVE. So far, this variant is the same, from the UE's perspective, as the first-described method above.

However, in this variant, if the UE AS later receives an indication from UE NAS that tracking area update should be triggered it sends an RRC Resume Request with cause value 'mo-signaling' to then receive and RRC Resume and send the TAU request multiplexed with Resume Complete.

It is worth mentioning that this variant gives flexibility to the network to not check the context to see if UE is crossing the TAI list border, which could simplify the network implementation. Notice that as in the main variant there will be cases where the UE only crosses an RNA and remains in the same TA or the same TA list. In these cases, the UE also sends the Resume Request and also waits for a Suspend message.

In that variant, from the network perspective, when a gNB receives an RRC Resume request message from a UE including an indication of RAN Notification Area Update (RNAU), the network may decide to either fetch the context of that UE and perform the actions as described in the second paragraph or simply move the UE directly to RRC_INACTIVE, to have the possibility to simplify the network implementation so that the UE, if needs to perform a TAU, will trigger again the procedure and send an RRC Resume Request with cause value 'mo-signaling'.

In yet another variant of the method (second variant), from the UE perspective, a UE configured to perform RNA updates and tracking area updates, when crossing the border of a tracking area list (and at the same time crossing the RNA list border, as these borders are overlapping) and identifying the need to perform both procedures, RNA update and TAU, always triggers first a tracking area update (TAU) i.e. sends and RRC Resume Request with a cause value associated to the update (e.g. 'mo-signaling') and waits for an RRC Resume message. And, upon receiving the RRC Resume message the UE moves to RRC_CONNECTED and, UE sends RRC Resume complete multiplexed with the Tracking Area Update NAS message and continue with the TAU procedure. In this variant, the UE only performs TAU even though both TAU and RNA have been triggered. Thus, from an external point of view, the UE's behavior appears similar to that described above in connection with a normal TAU. The difference here is that the UE's NAS entity has triggered a RNAU, but the UE has determined to perform only the TAU, since both a TAU and an RNAU are necessary. Note that this approach is effective because lif a UE goes to RRC_CONNECTED, in this case to perform the TAU, it is less relevant to update an RNA and a new RNA will be configured for the UE once it is later on suspended to RRC_INACTIVE again. In order to support this variant. the UE RRC layer (or entity that implements the RRC layer) will forward the Tracking Area Identifier (TAI) it receives from the target cell (e.g. on system information broadcast channel) to the NAS layer (or entity implementing the NAS layer) inside the UE. The RRC layer will in this case wait for the NAS layer to respond if a TAU is needed or not, before determining if it should initiate a RNA update. If TAU is needed no RNA update should be implemented.

In that variant, from the network perspective, when a gNB receives an RRC Resume request message from a UE including an indication of TAU (e.g. 'mo-signalling'), as that is performed via RRC Resume Request, the network may fetch the context of that UE responds with an RRC Connection Resume and move the UE to RRC_CONNECTED, wait for the RRC Resume Complete multiplexed with the TAU Request message, continue the TAU list with CN while it also decides in parallel whether it will change the UE context parameters e.g. I-RNTI, NCC, RNA configuration, etc or even decide whether that UE will be moved to RRC_INACTIVE or RRC_IDLE. Notice that even though we have described the invention to be applicable in the case of both TAU and RNAU procedures being triggered at the same time at the UE, that could also occur in other combinations of of NAS/data and AS procedures, such as: Simultaneous TAUs from NAS while UE identifies that it has UL data in buffer; Simultaneous TAUs from NAS while UE responds to paging; in that sense, one could interpret the method as generic handling of simultaneous AS and NAS requests.

One particular aspect of the present invention is when a RAN Area update is triggered and there is data in the UL buffer at the same time. In this situation, the UE should make a choice which cause value to provide in a resume request from RRC_INACTIVE.

According to one aspect of the present invention, it is (again) the procedure other than the RNAU that takes precedence and the cause value included in the resume request should be set to correspond to UL data.

In a situation when the network received the UL data cause in a resume request message (msg3) it will anyway retrieve the UE context and respond with an RRC resume message to move the UE to RRC_CONNECTED. In this situation, the RNAU will not be needed, as the UE will anyway be configured with a new RNA at RRC_Suspend, which may or may not happen, or may happen much later.

Similar if there is DL data waiting in the RAN node which holds the UE context, it is possible for the target RAN node to order the UE to RRC_CONNECTED even in case the UE indicates that it just wants to perform a RNA Update. The target RAN node could learn during UE context fetch if there is data in the source node. Could be signaled form source to target node over the X2 or Xn interface.

Thus, in one aspect of the present invention, the RNAU cause should be used only if there is no other relevant cause for sending an RRC Resume Request. If there is any other reason to send a resume, the cause of that other reason should be selected instead in the resume request message.

In this main variant of the solution, another aspect is the handling of the T300 timer, that is initiated when the UE sends the RRC Resume Request, stops when the UE receives the RRC Resume message and, upon expiring, UE inform higher layers about Resume Request failure. When UE receives once more the request from higher layers to send the TAU, and simultaneously have the pending RNA, the UE acts as described earlier, i.e., it only performs the RNA update until it gets to RRC_CONNECTED.

In the first variant of the solution, when it comes to the handling of the T300 timer, that is initiated when the UE sends the RRC Resume Request, stops when the UE receives the RRC Resume message or the RRC message suspending the UE and, upon expiring, UE informs higher layers about Resume Request failure. When UE receives once more the request from higher layers to send the TAU, and simultaneously have the pending RNA, the UE acts as described in the first variant, i.e., it only performs the RNA update.

In the second variant of the solution, when it comes to the handling of the T300 timer, that is initiated when the UE sends the RRC Resume Request, stops when the UE receives the RRC Resume message and, upon expiring, UE informs higher layers about Resume Request failure. When UE receives once more the request from higher layers to send the TAU, and simultaneously have the pending RNA, the UE acts as described in the second variant, i.e., it only performs the TAU.

According to some embodiments, a wireless device is configured to operate in a wireless communication network. The wireless device includes transceiver circuitry for communicating with the network and processing circuitry operatively associated with the transceiver circuitry. The processing circuitry is configured to determine, while in an RRC Inactive state, that both an RNAU and a TAU are needed. The processing circuitry is configured to transmit a RRC Resume Request message to the network, in response to the determining. The RRC Resume Request message includes a cause indicator indicating only an RNAU as a cause for resuming a RRC Connected state.

According to other embodiments, the processing circuitry of the wireless device is configured to perform other techniques discussed herein.

According to some embodiments, an access network node of a wireless communication system. The access network node includes transceiver circuitry for communicating with wireless devices and processing circuitry operatively associated with the transceiver circuitry. The processing circuitry is configured to receive, from a wireless device, a RRC Resume Request message. The RRC Resume Request message includes a cause indicator indicating only an RNAU as a cause for resuming a RRC Connected state. The processing circuitry is also configured to retrieve a context for the wireless device and determine, based on the context, whether a TAC of the cell receiving the RRC Resume Request is represented in a TAI list for the wireless device. The processing circuitry is also configured to selectively respond to the RRC Resume Request message with either a RRC Resume message, in the event that the TAC is not represented in the TAI list, or a RRC Suspend message, in the event that the TAC is represented in the TAI list.

According to other embodiments, the processing circuitry of the access network node is configured to perform other techniques discussed herein.

Further aspects of the present invention are directed to an apparatus, computer program products or computer readable storage medium corresponding to the methods summarized above and functional implementations of the above-summarized apparatus and wireless device.

Of course, the present invention is not limited to the above features and advantages. Those of ordinary skill in the art will recognize additional features and advantages upon reading the following detailed description, and upon viewing the accompanying drawings.

Details of various methods and apparatuses are provided below. In addition, an enumerated list of example embodiments of the presently disclosed techniques and apparatuses is provided.

DETAILED DESCRIPTION

The presently disclosed techniques are described in the context of 5GS wireless communications standards. It will be appreciated, however, that the techniques may be generally applicable to other wireless communications networks, such as a Long Term Evolution (LTE) network. For the purpose of understanding the scope of the presently disclosed techniques and apparatuses, a wireless device may be a UE. However, these terms should be understood more generally, as referring to wireless devices configured to operate as access terminals in a wireless communication network, whether those wireless devices are consumer-oriented devices such as cellular telephones, smartphones, wireless-equipped laptops, tablets, or the like, or machine-to-machine (M2M) devices for use in industrial applications or in enabling the Internet of Things (IoT). Likewise, the terms gNB, should be understood to refer generally to base stations or access network nodes in a wireless communications system.

Figure 1:
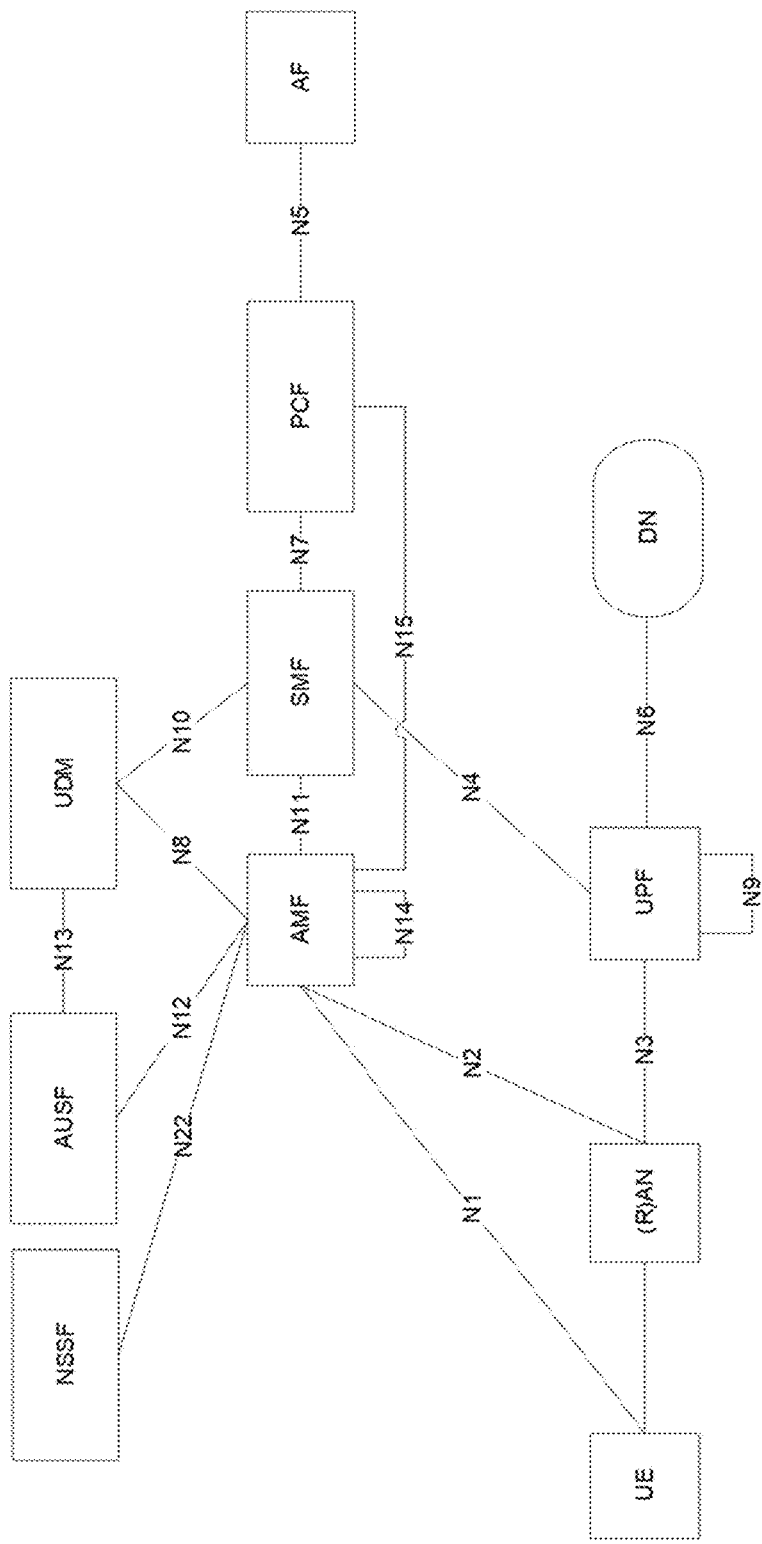
FIG. 1 illustrates an example of a 5G system architecture.
Figure 2:
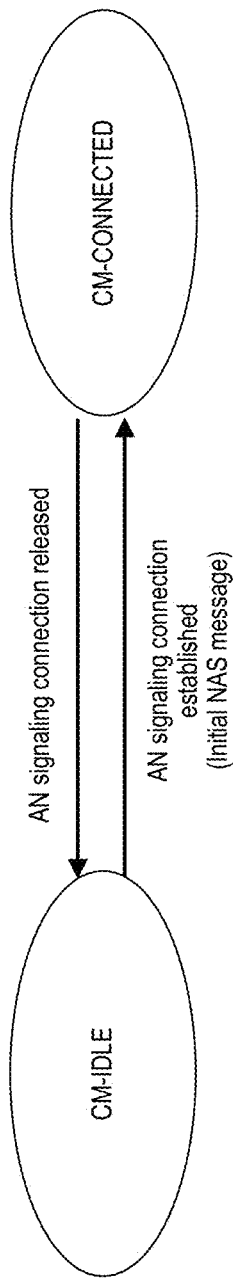
FIG. 2 illustrates CM state transition in a UE.
Figure 3:
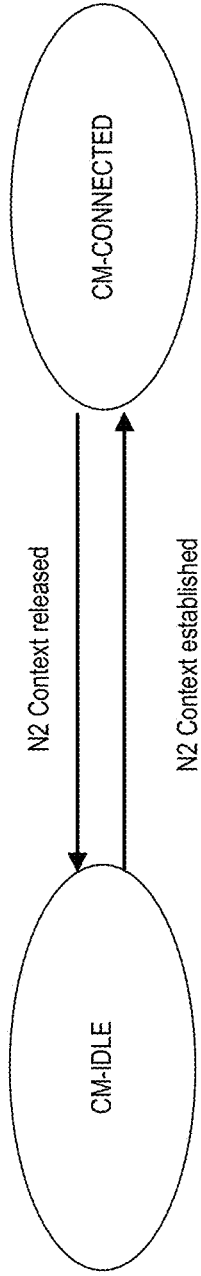
FIG. 3 illustrates CM state transition in an AMF.
Figure 4:
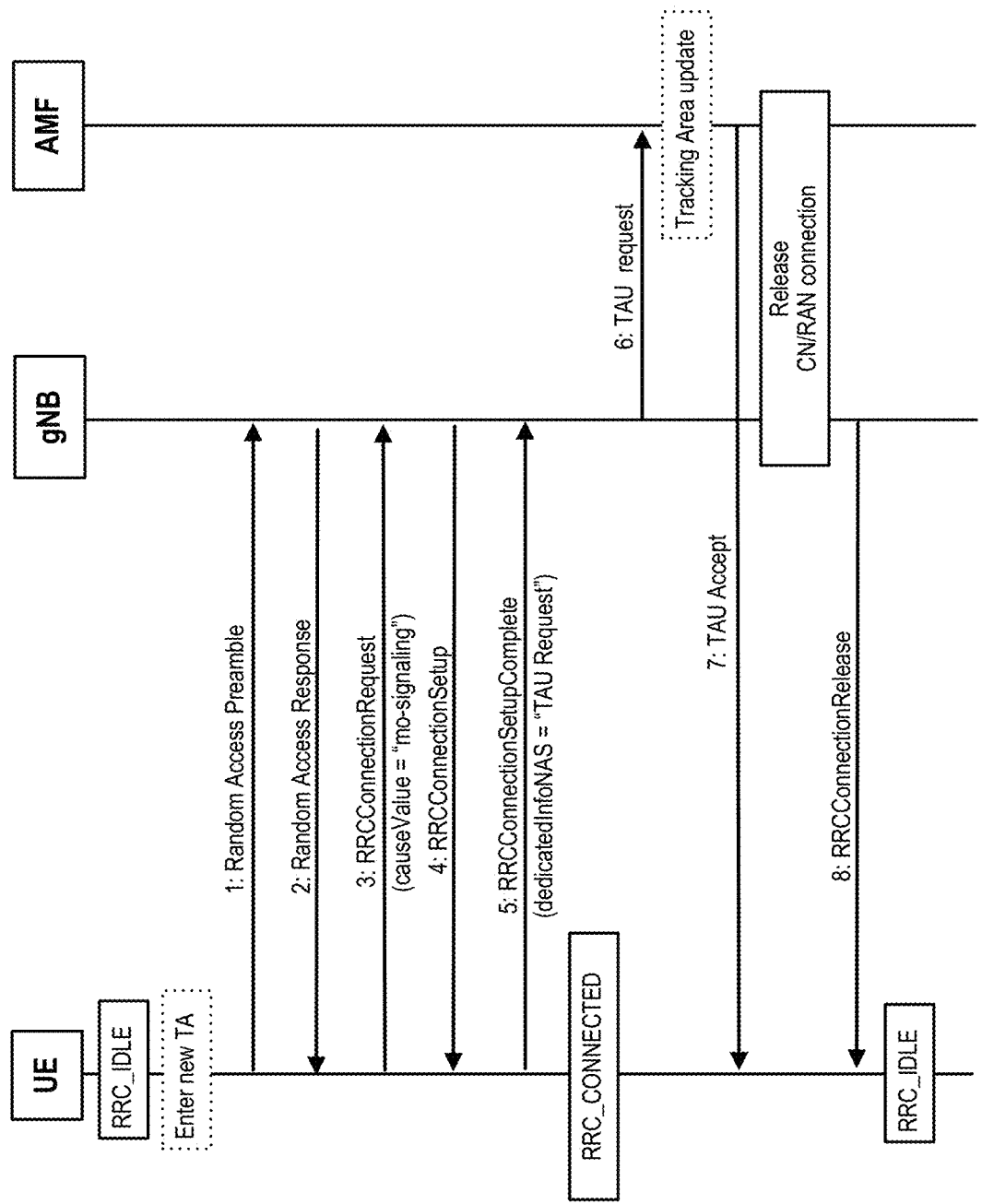
FIG. 4 illustrates a timing diagram of a tracking area update by a UR in RRC_IDLE.
Figure 5A:
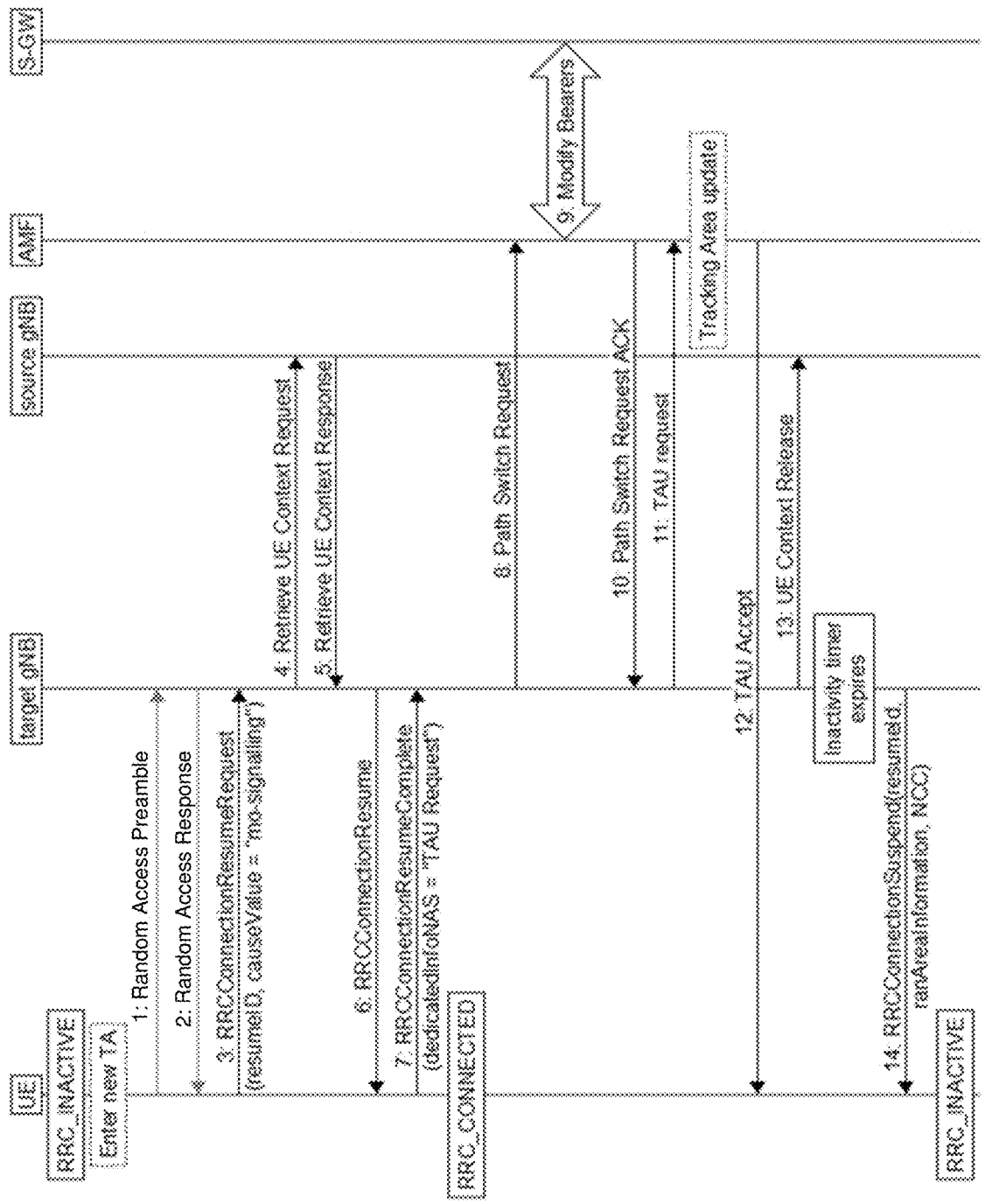
FIG. 5A illustrates a timing diagram of a tracking area update by a UE in RRC_INACTIVE.
Figure 5B:
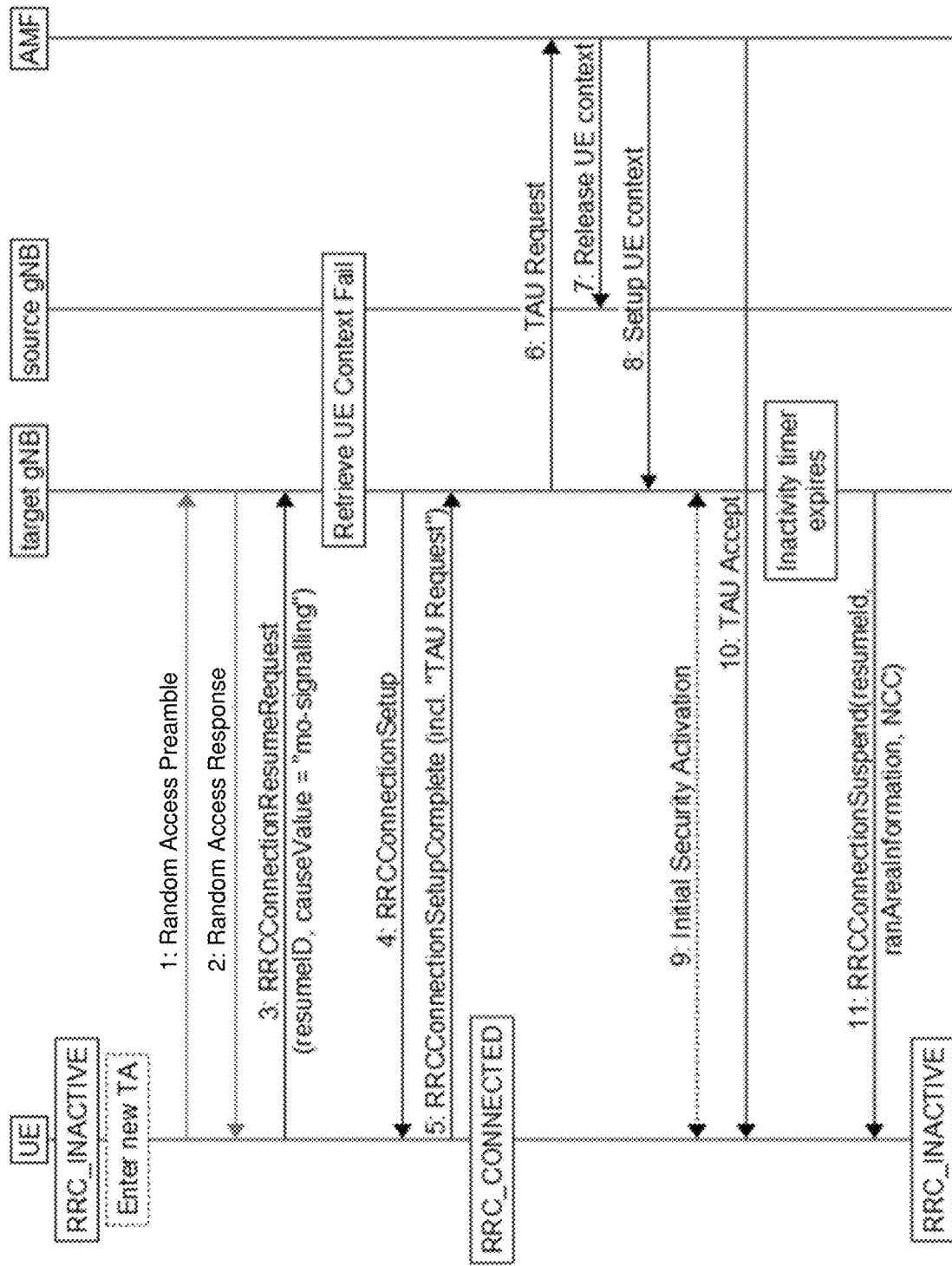
FIG. 5B illustrates a timing diagram of a tracking area update by a UE in RRC_INACTIVE with failed UE Context retrieval.

As discussed above, a network may avoid unnecessarily bringing a UE to RRC_CONNECTED and trigger both RLAU and TAU. Perhaps, the RLAU and TAU be synchronized so that they come together in the over-the-air messaging. Failing that, perhaps the network makes an intelligent decision at step 6 in FIGS. 5A/5B, not to release the UE back to INACTIVE but to bring it to RRC_CONNECTED to allow for the expected TAU.

One approach would be that if the gNB is on a TA boundary, it assumes that any RLAU may be related with a TAU and brings the UE to RRC_CONNECTED. This is not an ideal solution since many UEs may be moving TAs within their already configured TA list, so it results in some UEs being brought needlessly to RRC_CONNECTED. (The term "RLAU" as used in above may be understood as referring to an RNAU.)

With the proposed solution, any double signaling would be avoided, at least when the network prefers. Irrespective of how the UE does it, this is a network measure that guarantees that there are no failing updates. The UE may choose to trigger one before the other, it wouldn't matter, the network would anyway always make sure that if there is a need for a TAU, in resuming the connection, the TAU will be triggered.

Figure 6:
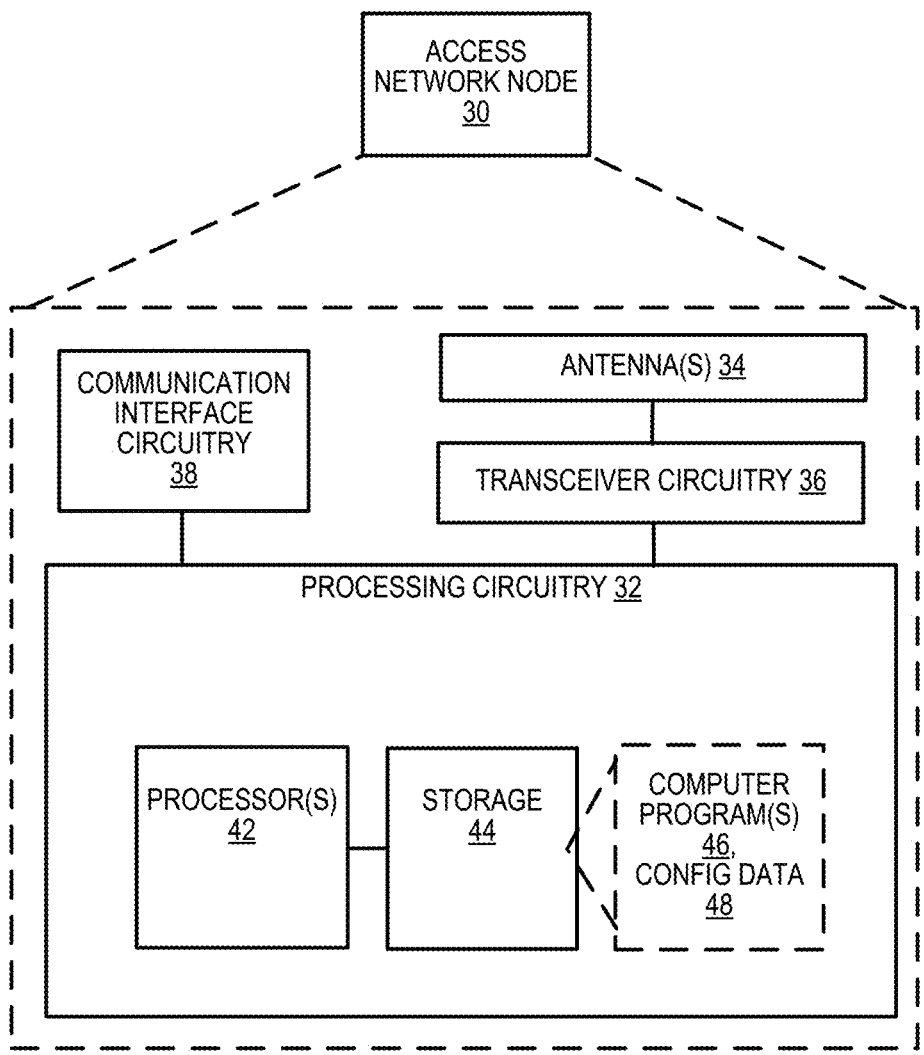
FIG. 6 is a block diagram illustrating an example access network node, according to some embodiments.

Accordingly, FIG. 6 is a block diagram illustrating an example access network node 30, which may be configured to operate as a base station. The access network node 30 may be, for example, 5G gNB. The access network node 30 provides an air interface to a wireless device, e.g., 5G air interface for downlink transmission and uplink reception, which is implemented via antennas 34 and transceiver circuitry 36. The transceiver circuitry 36 includes transmitter circuits, receiver circuits, and associated control circuits that are collectively configured to transmit and receive signals according to a radio access technology, for the purposes of providing cellular communication, or WLAN services if necessary. According to various embodiments, cellular communication services may be operated according to any one or more of the 3GPP cellular standards, GSM, GPRS, WCDMA, HSDPA, LTE, LTE-Advanced and 5G. The access network node 30 also include communication interface circuitry 38 for communicating with nodes in the core network, other peer radio nodes, and/or other types of nodes in the network.

The access network node 30 also includes one or more processing circuits 32 that are operatively associated with and configured to control the communication interface circuitry 38 and/or the transceiver circuitry 36. The processing circuitry 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any combination thereof. More generally, the processing circuitry 32 may comprise fixed circuitry, or programmable circuitry that is specially configured via the execution of program instructions implementing the functionality taught herein, or may comprise some combination of fixed and programmable circuitry. The processor(s) 42 may be multi-core.

The processing circuitry 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any combination thereof. By way of non-limiting example, the memory 44 may comprise any one or more of SRAM, DRAM, EEPROM, and FLASH memory, which may be in the processing circuitry 32 and/or separate from the processing circuitry 32. In general, the memory 44 comprises one or more types of computer-readable storage media providing non-transitory storage of the computer program 46 and any configuration data 48 used by the access network node 30. Here, "non-transitory"

means permanent, semi-permanent, or at least temporarily persistent storage and encompasses both long-term storage in non-volatile memory and storage in working memory, e.g., for program execution.

In some embodiments, the processing circuitry 32 of the access network node 30 is configured to receive, from a wireless device, a RRC Resume Request message. The RRC Resume Request message includes a cause indicator indicating only an RNAU as a cause for resuming an RRC Connected state. The processing circuitry 32 is configured to retrieve a context for the wireless device and determine, based on the context, whether a TAC of the cell receiving the RRC Resume Request is represented in a TAI list for the wireless device. The processing circuitry 32 is also configured to selectively respond to the RRC Resume Request message with either an RRC Resume message, in the event that the TAC is not represented in the TAI list, or a RRC Suspend message, in the event that the TAC is represented in the TAI list. The processing circuitry 32, in some embodiments, is configured to perform the variants described herein.

Figure 7A:
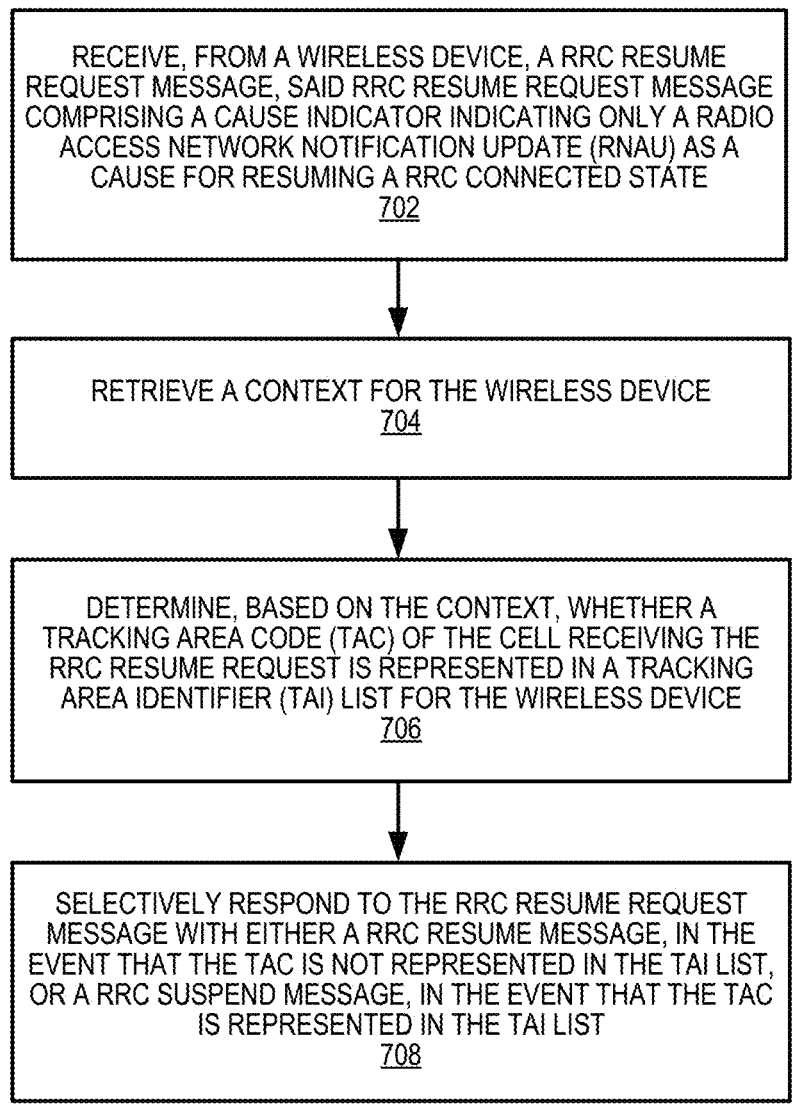
FIGS. 7A-7C are process flow diagrams illustrating example methods according to some embodiments, as carried out in an access network node.

The processing circuitry 32 is also configured to perform a corresponding method 700, shown in FIG. 7A. The method 700 includes receiving, from a wireless device, a RRC Resume Request message (block 702), where the RRC Resume Request message includes a cause indicator indicating only an RNAU as a cause for resuming a RRC Connected state. The method 700 also includes retrieving a context for the wireless device (block 704) and determining, based on the context, whether a TAC of the cell receiving the RRC Resume Request is represented in a TAI list for the wireless device (706). The method 700 includes selectively responding to the RRC Resume Request message with either a RRC Resume message, in the event that the TAC is not represented in the TAI list, or a RRC Suspend message, in the event that the TAC is represented in the TAI list (block 708).

The TAC may be represented in the TAI list, and the RRC Suspend message may include information configuring the wireless device with a new radio access network notification area (RNA). In some cases, the TAC is not represented in the TAI list, and the method 700 further includes receiving, in response to the RCC Resume message, an RRC Resume Complete message, the RRC Resume Complete message comprising or being combined with a TAU message.

There are variants of the process shown in FIG. 7A, as mentioned above. According to one variant, a method, in an access network node of a wireless communication system, includes receiving, from a wireless device, a RRC Resume Request message. The RRC Resume Request message includes a cause indicator indicating only a mobility signaling as a cause for resuming an RRC Connected state and retrieving a context for the wireless device. The method includes responding to the RRC Resume Request message with an RRC Resume message and receiving, in response to the RCC Resume message, an RRC Resume Complete message, the RRC Resume Complete message comprising or being combined with a TAU message.

The method may include determining, in response to the RRC Resume Request message, whether to change UE context parameters or whether to move the wireless device to RRC Inactive state without waiting for an RRC inactivity timer for the wireless device to expire.

In other embodiments, the processing circuitry 32 of the access network node 30 is configured to receive, from a wireless device, a RRC Resume Request message. The RRC Resume Request message includes a cause indicator indicating a mobility signaling as a cause for resuming an RRC Connected state. The processing circuitry 32 is configured to retrieve a context for the wireless device and respond to the RRC Resume Request message with an RRC Resume message. The processing circuitry 32 is configured to receive, in response to the RCC Resume message, an RRC Resume Complete message, the RRC Resume Complete message comprising or being combined with a TAU message.

Figure 7B:
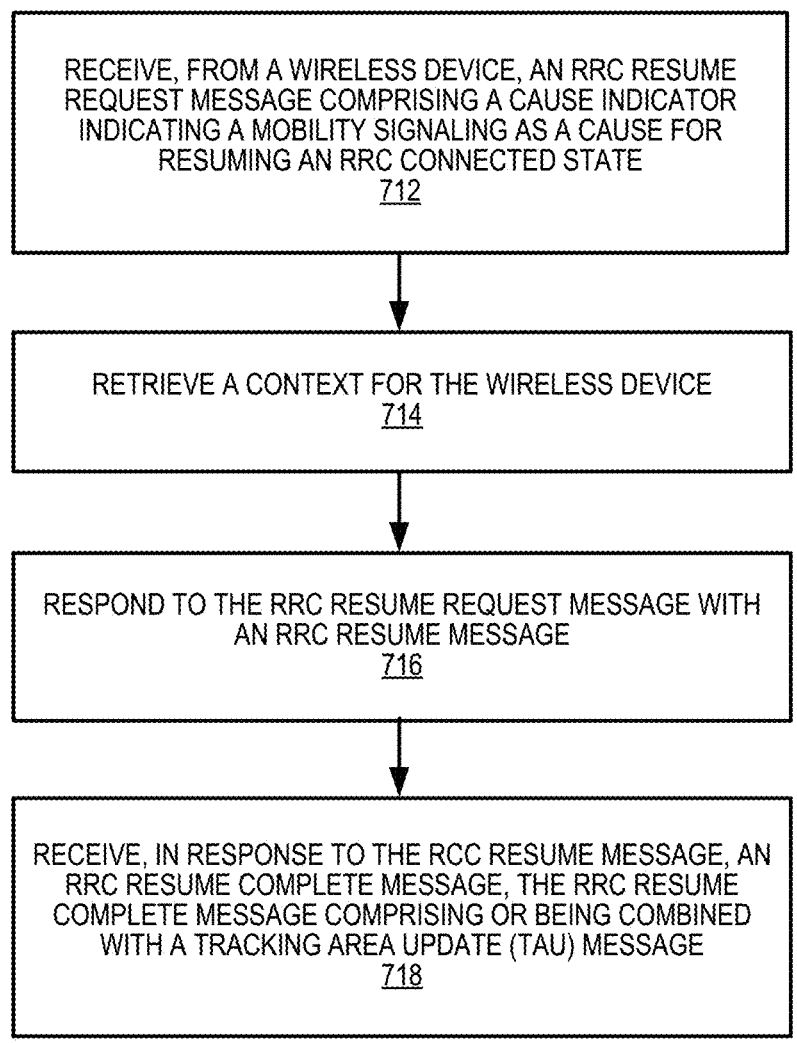

The processing circuitry 32 is also configured to perform a corresponding a method 710, shown in FIG. 7B. The method 710 includes receiving, from a wireless device, an RRC Resume Request message that includes a cause indicator indicating a mobility signaling as a cause for resuming an RRC Connected state (block 712). The method 710 also includes retrieving a context for the wireless device (block 714) and responding to the RRC Resume Request message with an RRC Resume message (block 716). The method 710 further includes receiving, in response to the RCC Resume message, an RRC Resume Complete message, the RRC Resume Complete message comprising or being combined with a TAU message (block 718). The method 710 may also include determining, in response to the RRC Resume Request message, whether to change UE context parameters or whether to move the wireless device to RRC Inactive state without waiting for an RRC inactivity timer for the wireless device to expire.

In other embodiments, the processing circuitry 32 of the access network node 30 is configured to receive, from a wireless device, a RRC Resume Request message. The RRC Resume Request message includes a cause indicator indicating an RNAU as a cause for resuming an RRC Connected state. The processing circuitry 32 is configured to retrieve a context for the wireless device and determine, based on the context, whether a tracking area code (TAC) of the cell receiving the RRC Resume Request is represented in a tracking area identifier (TAI) list for the wireless device. The processing circuitry 32 is configured to selectively respond to the RRC Resume Request message with either an RRC Resume message, in the event that the TAC is not represented in the TAI list, or an RRC Suspend message, in the event that the TAC is represented in the TAI list.

Figure 7C:
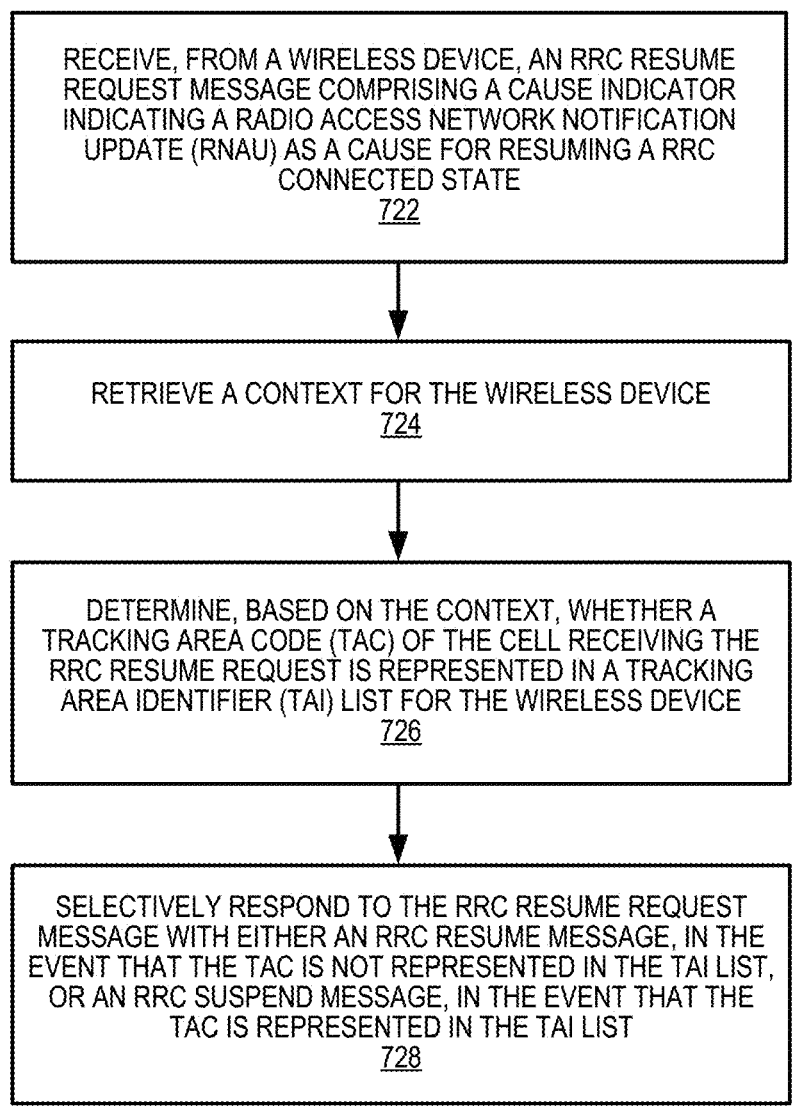

The processing circuitry 32 is also configured to perform a corresponding a method 720, shown in FIG. 7C. The method 720 includes receiving, from a wireless device, an RRC Resume Request message that includes a cause indicator indicating an RNAU as a cause for resuming an RRC Connected state (block 722). The method 720 also includes retrieving a context for the wireless device (block 724) and determining, based on the context, whether a TAC of the cell receiving the RRC Resume Request is represented in a TAI list for the wireless device (block 726). The method 720 further includes selectively responding to the RRC Resume Request message with either an RRC Resume message, in the event that the TAC is not represented in the TAI list, or an RRC Suspend message, in the event that the TAC is represented in the TAI list (block 728).

The TAC may be represented in the TAI list, and the RRC Suspend message may include information configuring the wireless device with a new radio access network notification area (RNA). The TAC may not be represented in the TAI list, and the method 720 may further comprises receiving, in response to the RCC Resume message, an RRC Resume Complete message, the RRC Resume Complete message comprising or being combined with a TAU message.

Figure 8:
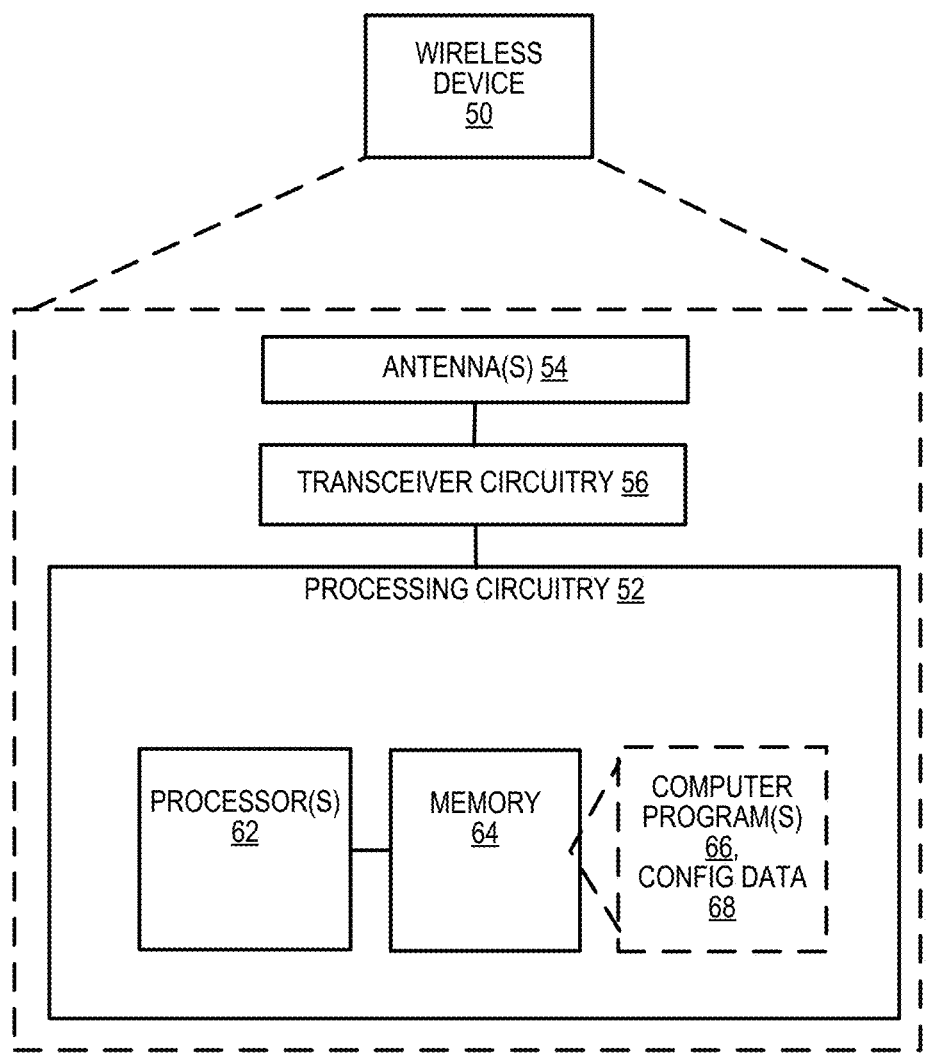
FIG. 8 is a block diagram illustrating an example wireless device, according to some embodiments.

FIG. 8 illustrates an example wireless device 50 that is configured to perform the techniques described herein for the wireless device. The wireless device 50 may also be referred to, in various contexts, as a radio communication device, a UE, a target device, a device-to-device (D2D) UE, a machine-type UE or UE capable of machine to machine (M2M) communication, a sensor-equipped UE, a PDA (personal digital assistant), a wireless tablet, a mobile terminal, a smart phone, laptop-embedded equipment (LEE), laptop-mounted equipment (LME), a wireless USB dongle, a Customer Premises Equipment (CPE), etc.

The wireless device 50 communicates with one or more radio nodes or base stations, such as one or more network nodes 30, via antennas 54 and a transceiver circuitry 56. The transceiver circuitry 56 may include transmitter circuits, receiver circuits, and associated control circuits that are collectively configured to transmit and receive signals according to a radio access technology, for the purposes of providing cellular communication services.

The wireless device 50 also includes one or more processing circuits 52 that are operatively associated with and control the radio transceiver circuitry 56. The processing circuitry 52 comprises one or more digital processing circuits, e.g., one or more microprocessors, microcontrollers, DSPs, FPGAs, CPLDs, ASICs, or any mix thereof. More generally, the processing circuitry 52 may comprise fixed circuitry, or programmable circuitry that is specially adapted via the execution of program instructions implementing the functionality taught herein, or may comprise some mix of fixed and programmed circuitry. The processing circuitry 52 may be multi-core.

The processing circuitry 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuitry 52 and/or separate from processing circuitry 52. In general, the memory 64 comprises one or more types of computer-readable storage media providing non-transitory storage of the computer program 66 and any configuration data 68 used by the wireless device 50.

Accordingly, in some embodiments, the processing circuitry 52 of the wireless device 50 is configured to determine, while in a RRC Inactive state, that both an RNAU and a TAU are needed. The processing circuitry 32 is also configured to transmit a RRC Resume Request message to the network, in response to the determining. The RRC Resume Request message includes a cause indicator indicating only an RNAU as a cause for resuming a RRC Connected state.

In other embodiments, the processing circuitry 52 is configured to determine, while in an RRC Inactive state, that an RNAU is needed and evaluate whether there is any other cause for resuming an RRC connected state, in addition to the need for the RNAU. The processing circuitry 52 is configured to transmit an RRC Resume Request message to the wireless communication network, in response to the determining. The RRC Resume Request message includes a cause indicator indicating an RNAU in the event that the evaluating identifies no other cause for resuming the RRC connected state.

In other embodiments, the processing circuitry 52 is configured to determine, while in an RRC Inactive state, that both an RNAU and a TAU are needed. The processing circuitry 52 is configured to transmit an RRC Resume Request message to the wireless communication network, in response to the determining. The RRC Resume Request message includes a cause indicator indicating a mobility signaling as a cause for resuming an RRC Connected state. The processing circuitry 52 is also configured to receive an RRC Resume message in response to the RRC Resume Request and initiate a TAU, in response to receiving the RRC Resume Request The processing circuitry 52, in some embodiments, is configured to perform the variants described herein.

Figure 9A:
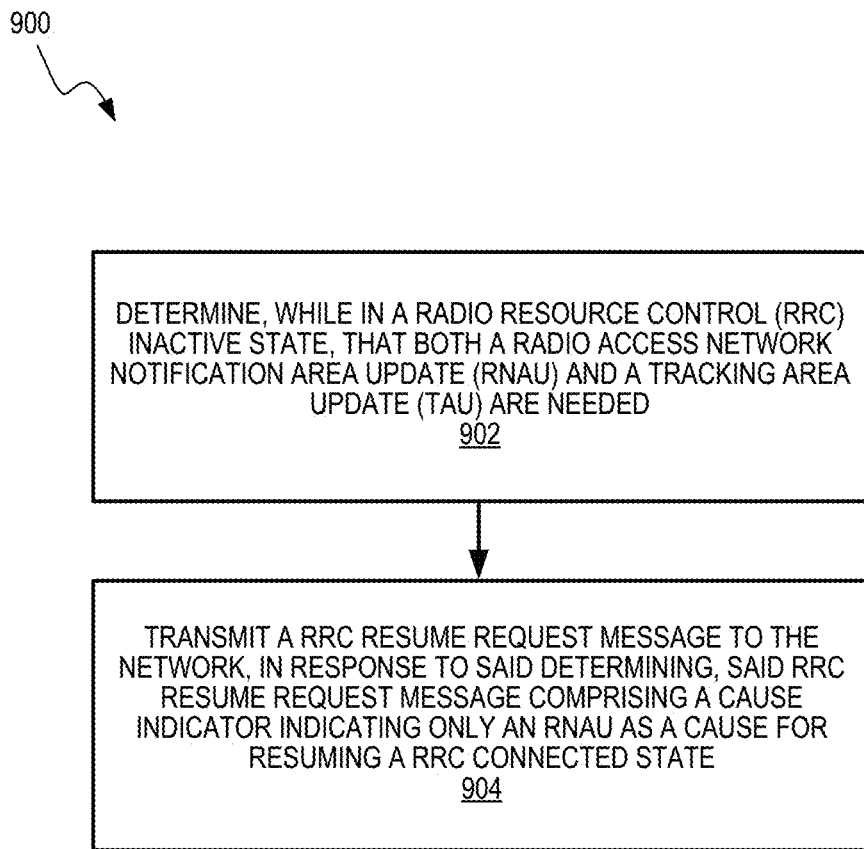
FIGS. 9A-9C are process flow diagrams illustrating example methods according to some embodiments, as carried out in a wireless device.

FIG. 9A is a process flow diagram illustrating a corresponding method 900 implemented in the wireless device 50. As shown at block 902, the method 900 includes determining, while in an RRC Inactive state, that both an RNAU and a TAU are needed. The method 900 also includes transmitting a RRC Resume Request message to the network, in response to the determining (block 904). The RRC Resume Request message includes a cause indicator indicating only an RNAU as a cause for resuming a RRC Connected state.

In some embodiments, the method 900 further includes receiving a RRC Resume message in response to the RRC Resume Request and sending a RRC Resume Complete message in response to the RRC Resume message, where the RRC Resume Complete message includes or is combined with a TAU message. The method 900 may further include transitioning to RRC Connected state, in response to the RRC Resume message, receiving, subsequently to said transitioning to RRC Connected state, an RRC Connection Suspend message, and transitioning to RRC Inactive state, in response to the RRC Connection Suspend message. The method 900 may include receiving or transmitting user plane data from the wireless communication network, while in said RRC Connected state. The method 900 may also include responding to a received paging message, while in said RRC Connected state.

In some embodiments, the method 900 includes receiving a RRC Connection Suspend message in response to the RRC Resume Request, without receiving an intervening RRC Resume message, and transitioning to or remaining in the RRC Inactive state, without performing a TAU procedure. The method 900 may further include determining, subsequently to receiving the RRC Connection Suspend message, that a TAU is needed, and, in response, initiating a TAU procedure by transmitting a second RRC Resume Request message to the network. The second RRC Resume Request message includes a cause indicator indicating mobility signaling as the cause for resuming the RRC Connected state.

In variant embodiments, a method in the wireless device 50 includes determining, while in an RRC Inactive state, that an RNAU is needed. The method includes transmitting a RRC Resume Request message to the network, in response to the determining. The RRC Resume Request message includes a cause indicator indicating only an RNAU as a cause for resuming a RRC Connected state. The method further includes receiving a RRC Resume message in response to the RRC Resume Request and initiating a TAU in response to receiving the RRC Resume Request, without regard to whether NAS functionality in the wireless device has determined a need for a TAU. The initiating may include sending a RRC Resume Complete message in response to the RRC Resume message, the RRC Resume Complete message comprising or being combined with a TAU message.

Figure 9B:
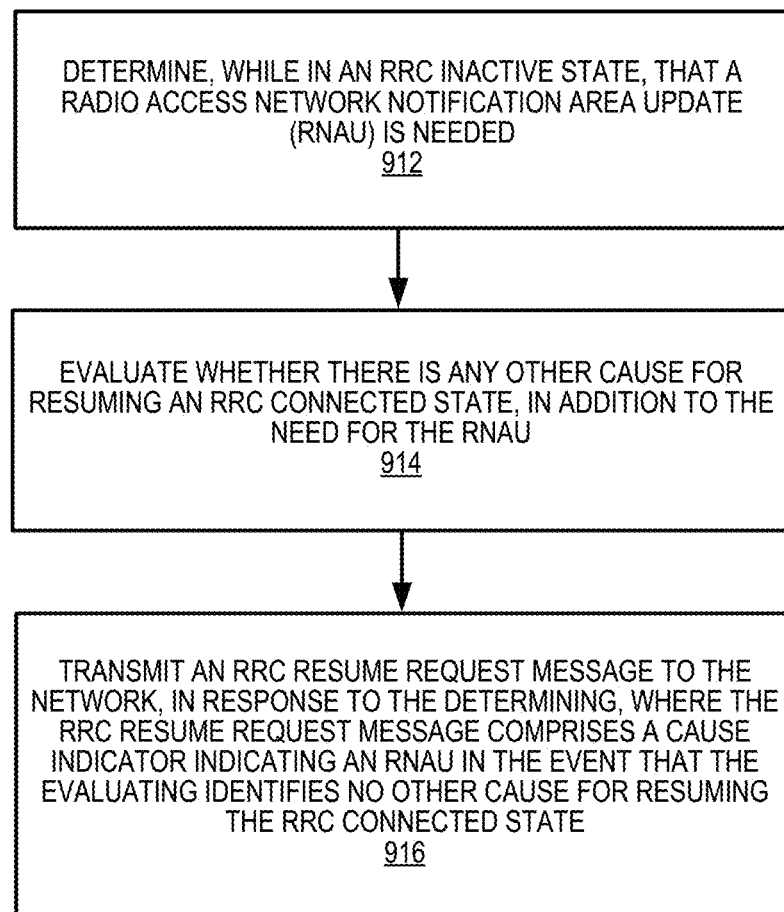

In some variant embodiments, a method 910 in the wireless device, shown in FIG. 9B, includes determining, while in an RRC Inactive state, that an RNAU is needed (block 912). Determining that an RNAU is needed may include performing a cell-reselection that selects a cell not belonging to an RNA configured for the wireless device. The method 910 includes evaluating whether there is any other cause for resuming a RRC connected state, in addition to the need for the RNAU (block 914), and transmitting a RRC Resume Request message to the network, in response to the determining (block 916). The RRC Resume Request message includes a cause indicator, wherein the cause indicator indicates a RNAU only in the event that said evaluating identifies no other cause for resuming the RRC connected state. In some cases, evaluating whether there is any other cause for resuming the RRC connected state includes determining that a TAU is needed. The cause indicator indicates mobility signaling as the cause for resuming the RRC connected state. In other cases, evaluating whether there is any other cause for resuming the RRC connected state includes determining whether there is any uplink data in the wireless device's buffer and determining whether the wireless device needs to respond to a paging message.

Figure 9C:
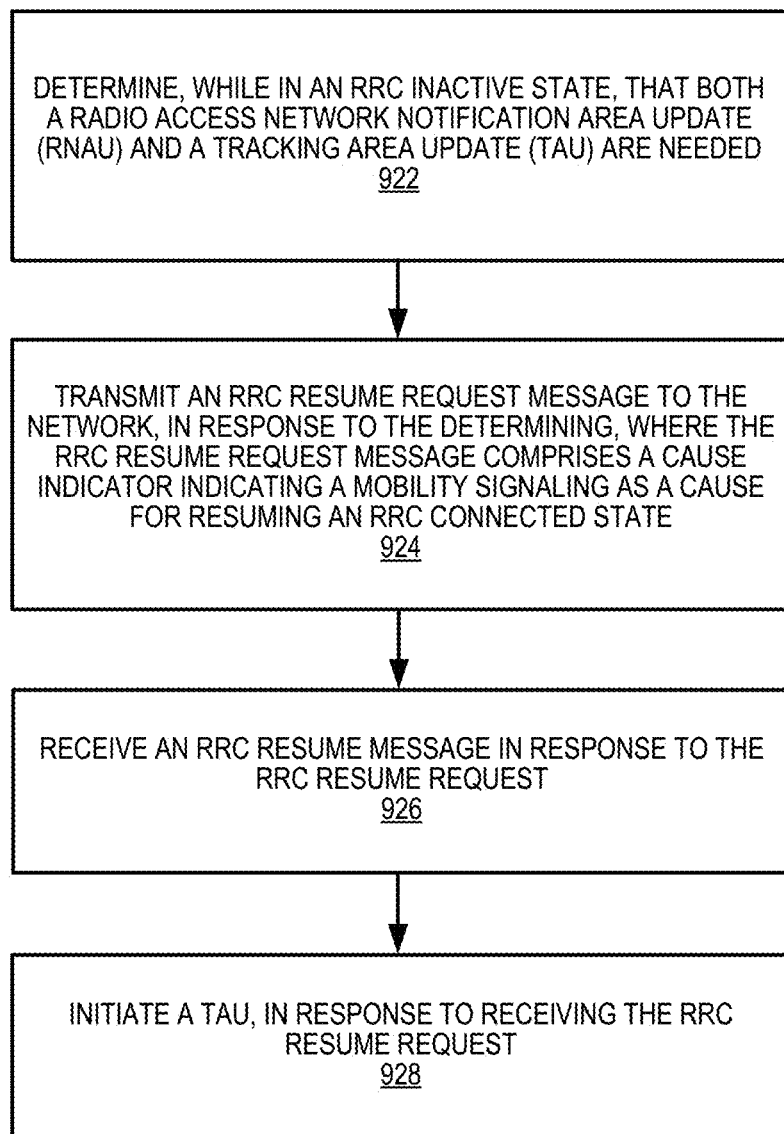

In some variant embodiments, a method 920 in the wireless device 50, shown in FIG. 9C, includes determining, while in an RRC Inactive state, that both an RNAU and a TAU are needed (block 922) and transmitting an RRC Resume Request message to the network, in response to the determining (block 924). The RRC Resume Request message includes a cause indicator indicating a mobility signaling as a cause for resuming an RRC Connected state. The method 920 also includes receiving an RRC Resume message in response to the RRC Resume Request (block 926) and initiating a TAU in response to receiving the RRC Resume Request (block 928). Determining that both an RNAU and a TAU are needed may include performing a cell-reselection that selects a cell not belonging to a configured RNA.

Figure 10:
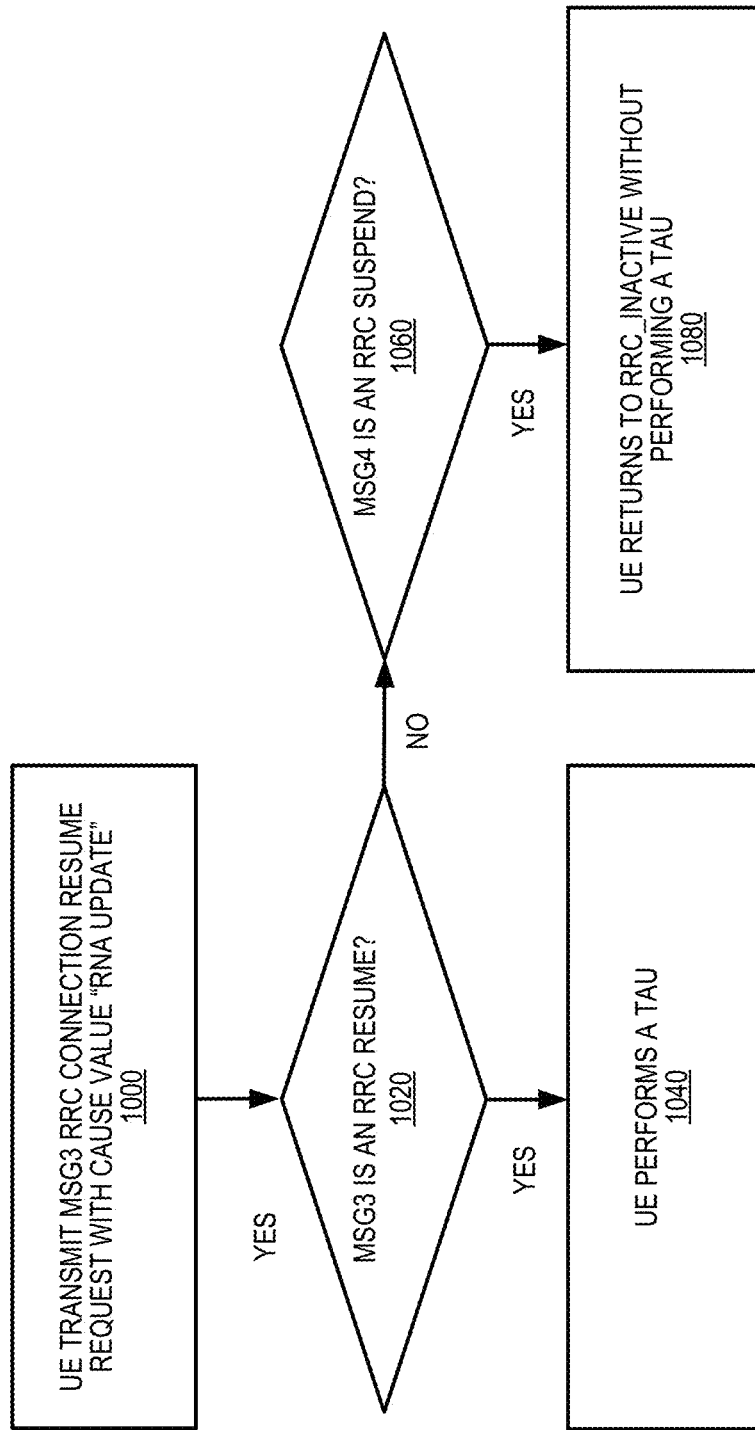
FIG. 10 is a process flow diagram illustrating another example method according to some embodiments, as carried out in a wireless device.

FIG. 10 illustrates another flowchart for a method in the UE, according to some embodiments. In step 1000, the UE triggers an RRC Resume Request message with purpose to resume the RRC connection. This is generally referred to as a msg3 transmission.

In 1020, an assessment is made in the UE on what the response type from the network is. This message is sometimes referred to as msg4. If the response from the network is an RRC Resume message that orders the UE to go to RRC_CONNECTED, according to some embodiments of the present invention, the UE should do a TAU towards the core network. This is illustrated in 1040. If msg4 is an RRC Suspend message 1060, the UE should instead return to RRC_INACTIVE without performing a TAU 1080.

Figure 11:
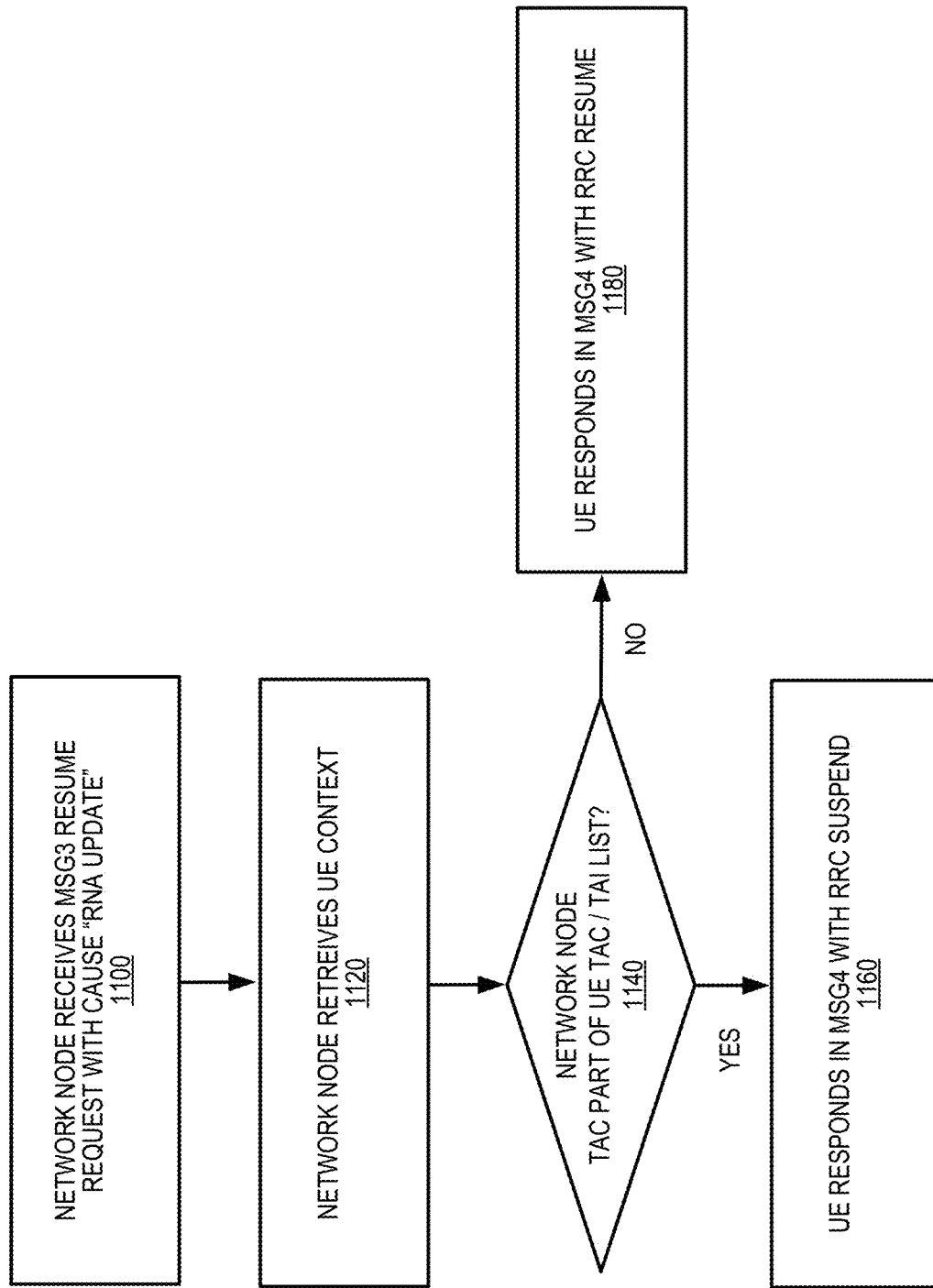
FIG. 11 is a process flow diagram illustrating another example method according to some embodiments, as carried out in an access network node.

FIG. 11 illustrates another flowchart for a method in the UE, according to some embodiments. The figure describes what is happening on the network side. "Network side" is here used to refer to a gNB, an ng-eNB or any other RAN node that supports suspending a UE with an RNA-like area and resuming said UE on request.

In step 1100, the network receives a resume request from the UE. In the resume request message, the UE include a cause code corresponding to "RNA-update", or a corresponding cause that indicate to the network node that UE wants to update its RNA. Included in the resume request is also an identifier that enables the UE to retrieve any information the access network has about that UE, the UE context.

In step 1120, the network node will retrieve information about the UE, through this UE context retrieval. In some instances, the UE context is stored in another (radio) network node and it may be necessary to signal to this other node for the current network node to get hold of the information. The identifier submitted in the request message may support the current network node to find where the UE context is stored.

In the UE context, there is information about what TAI-list, or what CN Registration area the UE is configured with. This is signaled from the core network node as described above and provided to the access network node in the RRC Inactive assistance information. In step 1140, the network will check the TAI list and correlate information in that list with the Tracking Area Code of the cell the UE is currently accessing through, the "serving cell". This is the cell in which the UE has sent the resume request message. If the TAC of the serving cell is represented in the TAI-list, then the network will choose to respond to the resume request with an RRC-suspend message (step 1160). In the RRC-suspend message, the UE may be configured with a new RNA, or it may keep its old RNA. Further, identifiers may or may not be updated, such that the UE next time it suspends may use different or the same identifiers. The UE will be suspended back to RRC_INACTIVE state.

If the TAC of the serving cell is not represented in the TAI-list of the UE, as given by the RRC Inactive assistance information, the network will respond with an RRC Resume message/procedure 1180, that will make the UE transition from RRC_INACTIVE to RRC_CONNECTED. This is also an indication that the UE should do a Tracking Area update.

The UE may initiate the Tracking Area Update already in the next message from the UE to the network, msg5, indicating TAU to NAS. This is further illustrated in the signaling diagrams of FIGS. 12-15. Example embodiments may include, in a UE, if a response to a msg3 with cause value indicating that UE should do an RNA Update; receive a msg4 that is a resume message; the UE should at least perform a Tracking Area Update.

Other examples may include, in a network, if receiving a msg3 with a resume cause RNAU, retrieve context. If the CN Reg Area (TAI List) does not include the TAC of the currently serving cell, send a resume in msg4. Else, if CN Reg Area (TAI List) does include the TAC of the currently serving cell; send a suspend in msg4. Else, send an RRC-Connection setup in msg4.

Figure 12:
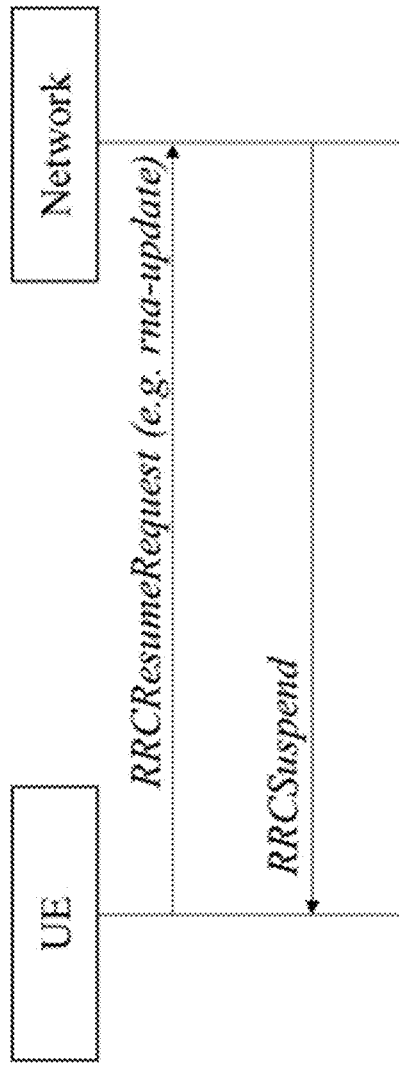
FIG. 12 illustrates RRC connection resume for RNA update, according to some embodiments.
Figure 13:
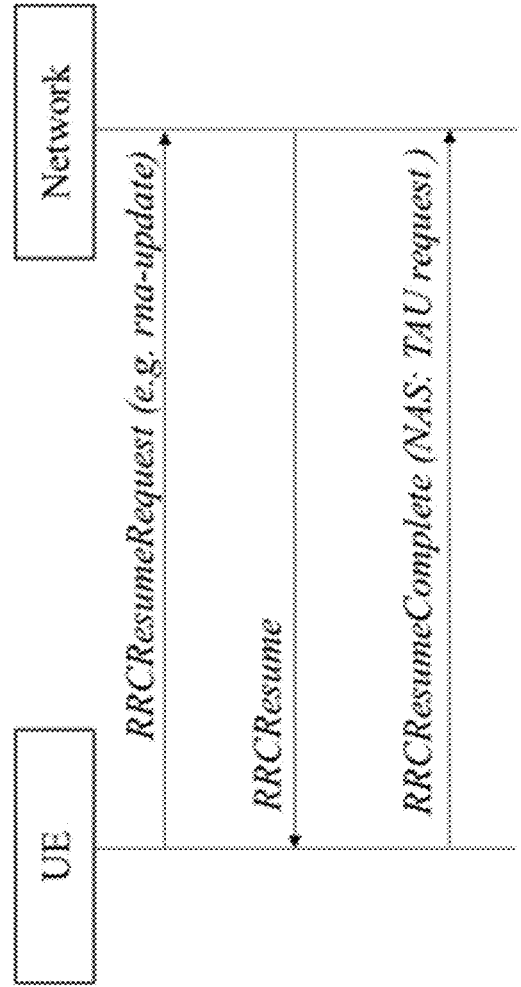
FIG. 13 illustrates RRC connection resume for combined RNA update and TAU, according to some embodiments.

FIGS. 12-13 are used to illustrate some RRC connection establishment embodiments. FIG. 12 illustrates an RRC connection resume (RNA update), and FIG. 13 illustrates an RRC connection resume (combined RNA update and TAU). Example text for describing these embodiments in 3GPP standardization documents may include the following:

5.3.3.1

The purpose of this procedure is to establish or resume an RRC connection or to perform an RNA update. RRC connection establishment involves SRB1 (and SRB1bis for NB-IoT) establishment. The procedure is also used to transfer the initial NAS dedicated information/message from the UE to E-UTRAN.

E-UTRAN applies the procedure as follows: When establishing an RRC connection: to establish SRB1 and, for NB-IoT, SRB1bis; When resuming an RRC connection: to restore the AS configuration from a stored context including resuming SRB(s) and DRB(s).

5.3.3.2 Initiation

The UE initiates the procedure when upper layers request establishment or resume of an RRC connection while the UE is in RRC_INACTIVE. The UE uses resume procedure when perform RNAU (RAN Notification Area Update) procedure.

Upon initiation of the procedure, the UE shall:
1> if the UE is resuming an RRC connection:
1> start timer T300;
1> if the UE is resuming an RRC connection:
2> initiate transmission of the RRCResumeRequest message in accordance with 5.3.3.3a;
1> else:
2> if stored, discard the UE AS context and i-rnti;
2> initiate transmission of the RRCConnectionRequest message in accordance with 5.3.3.3;

5.3.3.3a Actions Related to Transmission of RRCConnectionResumeRequest Message.

The UE shall set the contents of RRCResumeRequest message as follows:
1> if the UE receives from higher layers a request to perform tracking area update (or mo-signalling, in general) at the same time it identifies that it needs to perform a RNA update:
2> set the resumeCause to rna-update;
1> else
2> set the resumeCause in accordance with the information received from upper layers;

The UE shall submit the RRCConnectionResumeRequest message to lower layers for transmission.

In the case the UE receives from higher layers a request to perform both a tracking area update and an RNA update the UE behave as it would have to perform an RNA update and can send the MO signalling if network moves the UE to RRC Connected with an RRCResume message.

5.3.3.4a Reception of the RRCConnectionResume by the UE

The UE shall:
1> stop timer T300;
1> enter RRC_CONNECTED;
1> indicate to upper layers that the suspended RRC connection has been resumed;
1> set the content of RRCConnectionResumeComplete message as follows:
2> set the dedicatedInfoNAS to include the information received from upper layers e.g. tracking area update request.
1> submit the RRCConnectionResumeComplete message to lower layers for transmission;
1> the procedure ends.

5.3.3.6 T300 Expiry

The UE shall:
1> if timer T300 expires:
2> inform upper layers about the failure to establish the RRC connection or failure to resume the RRC connection with suspend indication, upon which the procedure ends;

Note that upon receiving that failure indication, upper layer will continue submitting the message when the AS is recovered. In the case of a failed resume triggered NAS due to a tracking area update simultaneously with a RNA update, when higher layers request once more to perform the TAU shall not perform the RNA update.

In some embodiments, for the first second variant, in response to the RRC Resume Request with a cause value 'rna-update' the UE may either receive: an RRC Resume message or; an RRC Release/Suspend message.

If the UE receives the Resume message, it can behave exactly as described in the text above. If the UE receives a Suspend message upon sending the RNA update, it shall just go to RRC_INACTIVE and then it will get a request from NAS to perform the TAU, i.e., it will send another RRC Resume Request with cause value 'mo-signaling', as also described above.

Other embodiments include a first second variant. In response to the RRC Resume Request with a cause value 'rna-update' the UE may either receive: an RRC Resume message; or an RRC Release/Suspend message.

If the UE receives the Resume message, it can behave exactly as described in the text above. If the UE receives a Suspend message upon sending the RNA update, it shall just go to RRC_INACTIVE and then it will get a request from NAS to perform the TAU, i.e., it will send another RRC Resume Request with cause value 'mo-signaling', as also described above.

Figure 14:
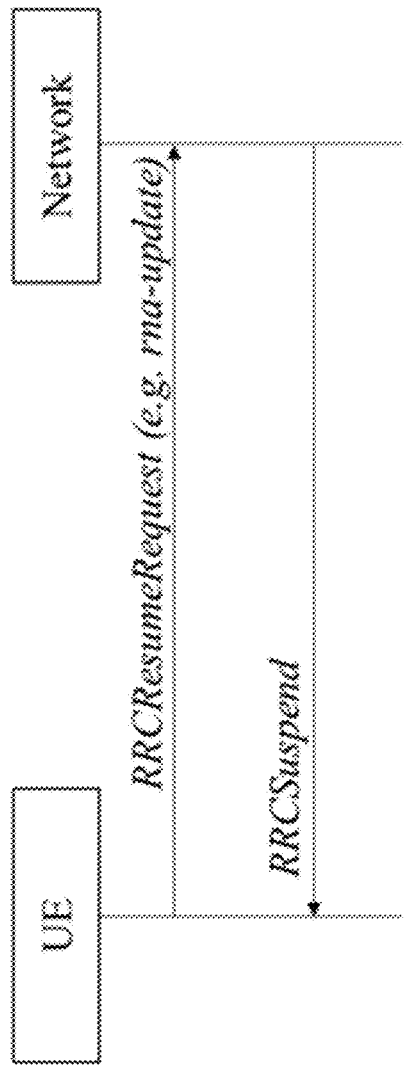
FIG. 14 illustrates RRC connection resume for RNA update, according to some embodiments.
Figure 15:
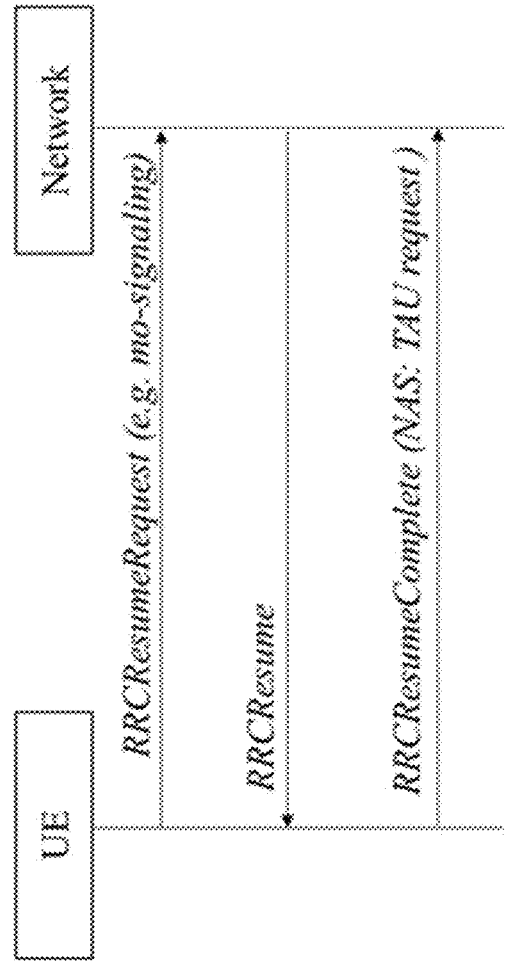
FIG. 15 illustrates a variation of RRC connection resume for combined RNA update and TAU, according to some embodiments.

Some embodiments include a second variant, as shown by FIGS. 14-15, showing a variation of RRC connection resume (RNA update) and RRC connection resume (combined RNA update and TAU).

The purpose of this procedure is to establish or resume an RRC connection or to perform an RNA update. RRC connection establishment involves SRB1 (and SRB1bis for NB-IoT) establishment. The procedure is also used to transfer the initial NAS dedicated information/message from the UE to E-UTRAN.

E-UTRAN applies the procedure as follows: When establishing an RRC connection: to establish SRB1 and, for NB-IoT, SRB1bis; When resuming an RRC connection: to restore the AS configuration from a stored context including resuming SRB(s) and DRB(s).

This variation is illustrated by the text below, similar to the text above.

5.3.3.2 Initiation

The UE initiates the procedure when upper layers request establishment or resume of an RRC connection while the UE is in RRC_INACTIVE. The UE uses resume procedure when perform RNAU (RAN Notification Area Update) procedure.

Upon initiation of the procedure, the UE shall:
1> if the UE is resuming an RRC connection:
1> start timer T300;
1> if the UE is resuming an RRC connection:
2> initiate transmission of the RRCResumeRequest message in accordance with 5.3.3.3a;
1> else:
2> if stored, discard the UE AS context and i-rnti;
2> initiate transmission of the RRCConnectionRequest message in accordance with 5.3.3.3;

5.3.3.3a Actions Related to Transmission of RRCConnectionResumeRequest Message

The UE shall set the contents of RRCResumeRequest message as follows:
1> if the UE receives from higher layers a request to perform tracking area update (or mo-signaling, in general) at the same time it identifies that it needs to perform a RNA update:
2> set the resumeCause to mo-signalling and do not perform RNA update;
1> else
2> set the resumeCause in accordance with the information received from upper layers;

The UE shall submit the RRCConnectionResumeRequest message to lower layers for transmission.

In the case the UE receives from higher layers, a request to perform both a tracking area update and an RNA update the UE shall behave as it would have to perform only a tracking area update.

5.3.3.4a Reception of the RRCConnectionResume by the UE

The UE shall:
1> stop timer T300;
1> enter RRC_CONNECTED;
1> indicate to upper layers that the suspended RRC connection has been resumed;
1> set the content of RRCConnectionResumeComplete message as follows:
2> set the dedicatedInfoNAS to include the information received from upper layers e.g. tracking area update request.
1> submit the RRCConnectionResumeComplete message to lower layers for transmission; 1> the procedure ends.

5.3.3.6 T300 Expiry

The UE shall:
1> if timer T300 expires:
2> inform upper layers about the failure to establish the RRC connection or failure to resume the RRC connection with suspend indication, upon which the procedure ends;

Note that upon receiving that failure indication, upper layer will continue submitting the message when the AS is recovered. In the case of a failed resume triggered NAS due to a tracking area update simultaneously with a RNA update, when higher layers request once more to perform the TAU shall not perform the RNA update.

The core essence of some embodiments of the solutions described herein may include ensuring that TACs are done when they are needed, i.e., when there is either a mismatch in what UE and NW consider UE registration areas or when UE has prioritized to send RNAU when there is a need for a CN registration area update.

Some embodiments of the invention include the UE always selecting any resume cause other than RNA update, if such cause is applicable, before selecting RNA update cause, when sending an RRC Resume Request. Thus, when there is a need for RNAU, if there is simultaneously any other need from a UE to do a resume, the cause value for the other need shall be selected.

Figure 16:
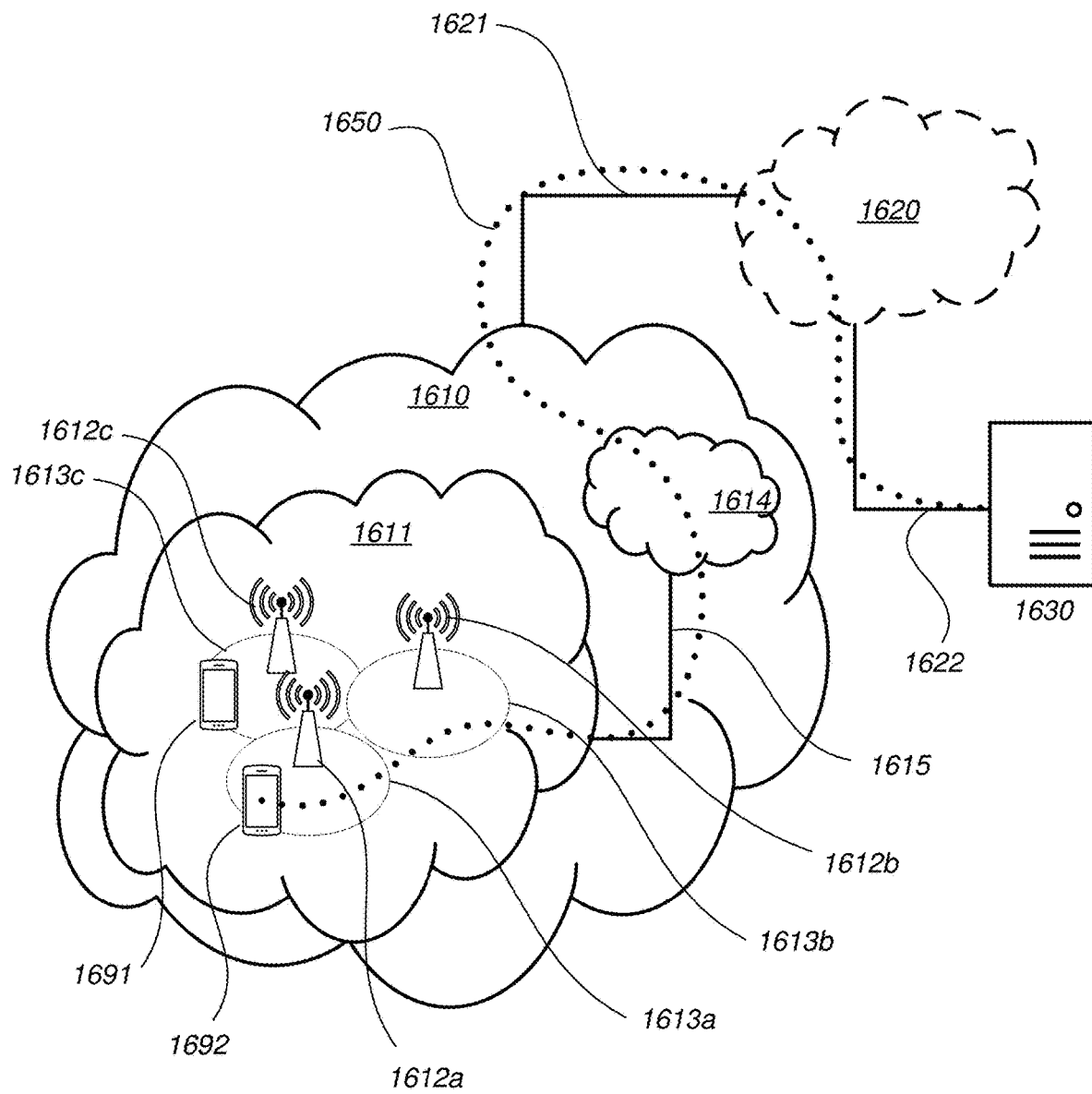
FIG. 16 illustrates an example communication system, according to some embodiments.

FIG. 16, in accordance with various embodiments, shows a communication system that includes a telecommunication network 1610, such as a 3GPP-type cellular network, which comprises an access network 1611, such as an gNB-RAN, and a core network 1614 (e.g., 5GC). The access network 1611 comprises a plurality of base stations 1612a, 1612b, 1612c, such as gNBs or other types of wireless access points, each defining a corresponding coverage area 1613a, 1613b, 1613c. Each base station 1612a, 1612b, 1612c is connectable to the core network 1614 over a wired or wireless connection 1615. A first user equipment (UE) 1691 located in coverage area 1613c is configured to wirelessly connect to, or be paged by, the corresponding base station 1612c. A second UE 1692 in coverage area 1613a is wirelessly connectable to the corresponding base station 1612a. While a plurality of UEs 1691, 1692 are illustrated in this example, the disclosed embodiments are equally applicable to a situation where a sole UE is in the coverage area or where a sole UE is connecting to the corresponding base station 1612.

The telecommunication network 1610 is itself connected to a host computer 1630, which may be embodied in the hardware and/or software of a standalone server, a cloud-implemented server, a distributed server or as processing resources in a server farm. The host computer 1630 may be under the ownership or control of a service provider, or may be operated by the service provider or on behalf of the service provider. The connections 1621, 1622 between the telecommunication network 1610 and the host computer 1630 may extend directly from the core network 1614 to the host computer 1630 or may go via an optional intermediate network 1620. The intermediate network 1620 may be one of, or a combination of more than one of, a public, private or hosted network; the intermediate network 1620, if any, may be a backbone network or the Internet; in particular, the intermediate network 1620 may comprise two or more sub-networks (not shown).

The communication system of FIG. 16 as a whole enables connectivity between one of the connected UEs 1691, 1692 and the host computer 1630. The connectivity may be described as an over-the-top (OTT) connection 1650. The host computer 1630 and the connected UEs 1691, 1692 are configured to communicate data and/or signaling via the OTT connection 1650, using the access network 1611, the core network 1614, any intermediate network 1620 and possible further infrastructure (not shown) as intermediaries. The OTT connection 1650 may be transparent in the sense that the participating communication devices through which the OTT connection 1650 passes are unaware of routing of uplink and downlink communications. For example, a base station 1612 may not or need not be informed about the past routing of an incoming downlink communication with data originating from a host computer 1630 to be forwarded (e.g., handed over) to a connected UE 1691. Similarly, the base station 1612 need not be aware of the future routing of an outgoing uplink communication originating from the UE 1691 towards the host computer 1630.

Example implementations, in accordance with an embodiment, of the UE, base station and host computer discussed in the preceding paragraphs will now be described with reference to FIG. 17. In a communication system 1700, a host computer 1710 comprises hardware 1715 including a communication interface 1716 configured to set up and maintain a wired or wireless connection with an interface of a different communication device of the communication system 1700. The host computer 1710 further comprises processing circuitry 1718, which may have storage and/or processing capabilities. In particular, the processing circuitry 1718 may comprise one or more programmable processors, application-specific integrated circuits, field programmable gate arrays or combinations of these (not shown) adapted to execute instructions. The host computer 1710 further comprises software 1711, which is stored in or accessible by the host computer 1710 and executable by the processing circuitry 1718. The software 1711 includes a host application 1712. The host application 1712 may be operable to provide a service to a remote user, such as a UE 1730 connecting via an OTT connection 1750 terminating at the UE 1730 and the host computer 1710. In providing the service to the remote user, the host application 1712 may provide user data which is transmitted using the OTT connection 1750.

The communication system 1700 further includes a base station 1720 provided in a telecommunication system and comprising hardware enabling it to communicate with the host computer 1710 and with the UE 1730. The hardware may include a communication interface for setting up and maintaining a wired or wireless connection with an interface of a different communication device of the communication system 1700, as well as a radio interface for setting up and maintaining at least one wireless connection 1770 with a UE 1730 located in a coverage area (not shown in FIG. 17) served by the base station 1720. The communication interface may be configured to facilitate a connection 1760 to the host computer 1710. The connection 1760 may be direct or it may pass through a core network (not shown in FIG. 17) of the telecommunication system and/or through one or more intermediate networks outside the telecommunication system. In the embodiment shown, the base station 1720 comprises a control unit 10 (e.g., gNB-CU) that controls radio access points 30 (e.g., gNB-DUs) that communicate with and may perform handover for the UE 1730. The details of the radio access point 30 were described earlier with reference to FIG. 6.

The communication system 1700 further includes the UE 1730 already referred to. Its hardware 1735 may include a radio interface 1737 configured to set up and maintain a wireless connection 1770 with a base station serving a coverage area in which the UE 1730 is currently located. The hardware 1735 of the UE 1730 further includes processing circuitry 1738, which may comprise one or more programmable processors, application-specific integrated circuits, field programmable gate arrays or combinations of these (not shown) adapted to execute instructions. The UE 1730 further comprises software 1731, which is stored in or accessible by the UE 1730 and executable by the processing circuitry 1738. The software 1731 includes a client application 1732. The client application 1732 may be operable to provide a service to a human or non-human user via the UE 1730, with the support of the host computer 1710. In the host computer 1710, an executing host application 1712 may communicate with the executing client application 1732 via the OTT connection 1750 terminating at the UE 1730 and the host computer 1710. In providing the service to the user, the client application 1732 may receive request data from the host application 1712 and provide user data in response to the request data. The OTT connection 1750 may transfer both the request data and the user data. The client application 1732 may interact with the user to generate the user data that it provides.

Figure 17:
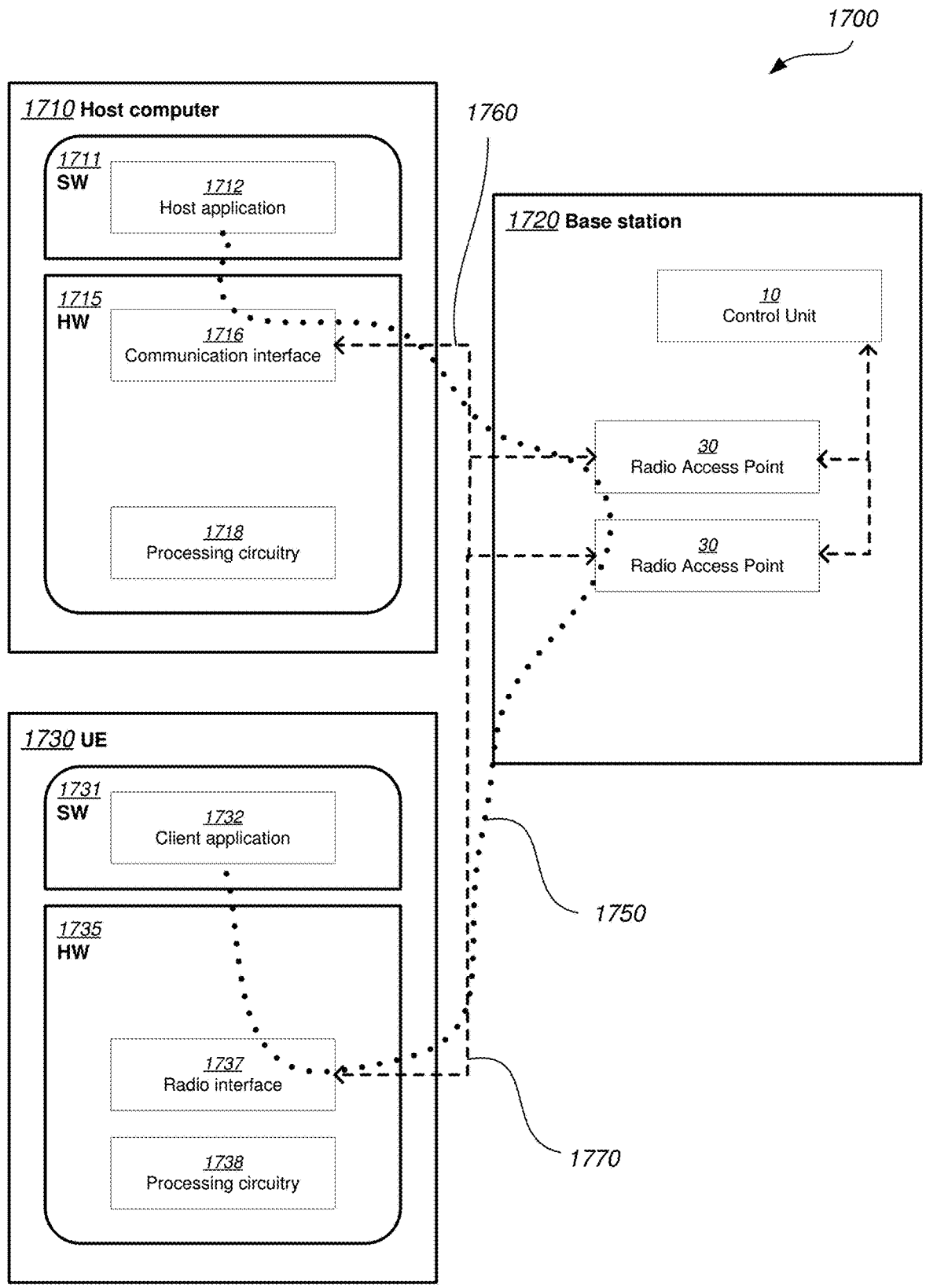
FIG. 17 is a generalized block diagram of a host computer communicating via a base station with a user equipment over a partially wireless connection, according to some embodiments.

It is noted that the host computer 1710, base station 1720 and UE 1730 illustrated in FIG. 17 may be identical to the host computer 1630, one of the base stations 1612*a*, 1612*b*, 1612*c* and one of the UEs 1691, 1692 of FIG. 16, respectively. This is to say, the inner workings of these entities may be as shown in FIG. 17 and independently, the surrounding network topology may be that of FIG. 16.

In FIG. 17, the OTT connection 1750 has been drawn abstractly to illustrate the communication between the host computer 1710 and the use equipment 1730 via the base station 1720, without explicit reference to any intermediary devices and the precise routing of messages via these devices. Network infrastructure may determine the routing, which it may be configured to hide from the UE 1730 or from the service provider operating the host computer 1710, or both. While the OTT connection 1750 is active, the network infrastructure may further make decisions by which it dynamically changes the routing (e.g., on the basis of load balancing consideration or reconfiguration of the network).

The wireless connection 1770 between the UE 1730 and the base station 1720 is in accordance with the teachings of the embodiments described throughout this disclosure. One or more of the various embodiments improve the performance of OTT services provided to the UE 1730 using the OTT connection 1750, in which the wireless connection 1770 forms the last segment. More precisely, the teachings of these embodiments may help the network to avoid unnecessarily bringing a UE to RRC_CONNECTED and provide a solution that avoids any "double procedures" where the UE triggers both RLAU and TAU. These embodiments will result in improved performance, such as better and/or more consistent throughput, and/or reduced delays, for users of the RAN, including during idle/connection transitions.

A measurement procedure may be provided for the purpose of monitoring data rate, latency and other factors on which the one or more embodiments improve. There may further be an optional network functionality for reconfiguring the OTT connection 1750 between the host computer 1710 and UE 1730, in response to variations in the measurement results. The measurement procedure and/or the network functionality for reconfiguring the OTT connection 1750 may be implemented in the software 1711 of the host computer 1710 or in the software 1731 of the UE 1730, or both. In embodiments, sensors (not shown) may be deployed in or in association with communication devices through which the OTT connection 1750 passes; the sensors may participate in the measurement procedure by supplying values of the monitored quantities exemplified above, or supplying values of other physical quantities from which software 1711, 1731 may compute or estimate the monitored quantities. The reconfiguring of the OTT connection 1750 may include message format, retransmission settings, preferred routing etc.; the reconfiguring need not affect the base station 1720, and it may be unknown or imperceptible to the base station 1720. Such procedures and functionalities may be known and practiced in the art. In certain embodiments, measurements may involve proprietary UE signaling facilitating the host computer's 1710 measurements of throughput, propagation times, latency and the like. The measurements may be implemented in that the software 1711, 1731 causes messages to be transmitted, in particular empty or 'dummy' messages, using the OTT connection 1750 while it monitors propagation times, errors etc.

Figure 18:
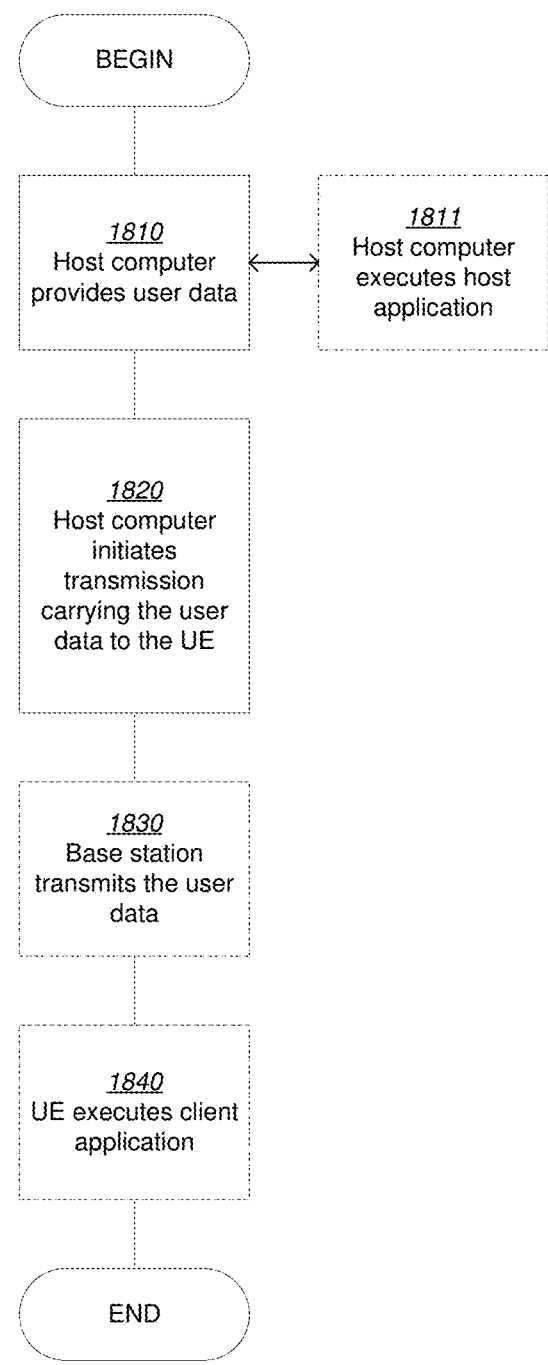
FIGS. 18-21 are flowcharts illustrating methods implemented in a communication system including a host computer, a base station and a user equipment.

FIG. 18 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 18 will be included in this section. In a first step 1810 of the method, the host computer provides user data. In an optional substep 1811 of the first step 1810, the host computer provides the user data by executing a host application. In a second step 1820, the host computer initiates a transmission carrying the user data to the UE. In an optional third step 1830, the base station transmits to the UE the user data which was carried in the transmission that the host computer initiated, in accordance with the teachings of the embodiments described throughout this disclosure. In an optional fourth step 1840, the UE executes a client application associated with the host application executed by the host computer.

Figure 19:
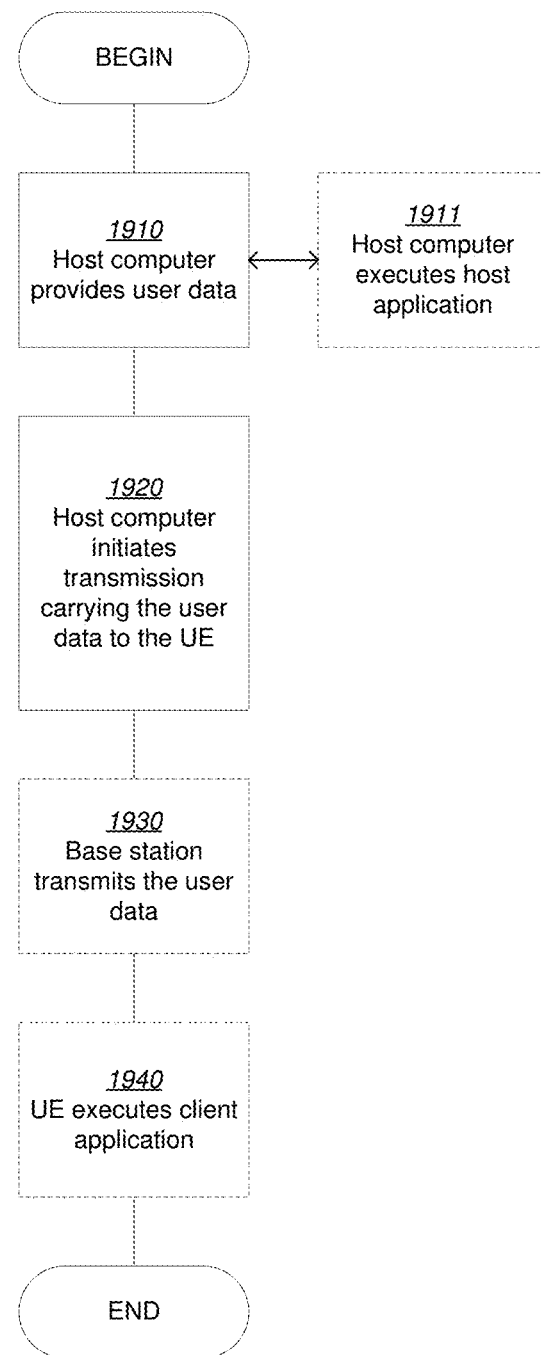

FIG. 19 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 19 will be included in this section. In a first step 1910 of the method, the host computer provides user data. In an optional substep (not shown), the host computer provides the user data by executing a host application. In a second step 1920, the host computer initiates a transmission carrying the user data to the UE. The transmission may pass via the base station, in accordance with the teachings of the embodiments described throughout this disclosure. In an optional third step 1930, the UE receives the user data carried in the transmission.

Figure 20:
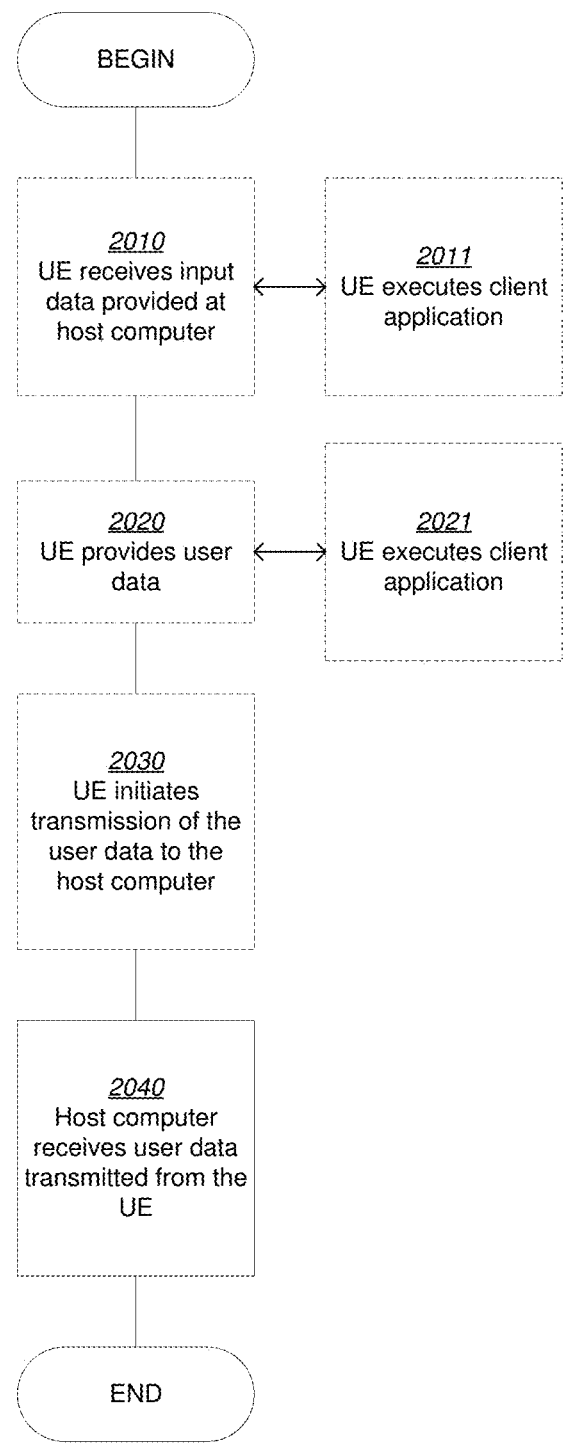

FIG. 20 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 20 will be included in this section. In an optional first step 2010 of the method, the UE receives input data provided by the host computer. Additionally or alternatively, in an optional second step 2020, the UE provides user data. In an optional substep 2021 of the second step 2020, the UE provides the user data by executing a client application. In a further optional substep 2011 of the first step 2010, the UE executes a client application which provides the user data in reaction to the received input data provided by the host computer. In providing the user data, the executed client application may further consider user input received from the user. Regardless of the specific manner in which the user data was provided, the UE initiates, in an optional third substep 2030, transmission of the user data to the host computer. In a fourth step 2040 of the method, the host computer receives the user data transmitted from the UE, in accordance with the teachings of the embodiments described throughout this disclosure.

Figure 21:
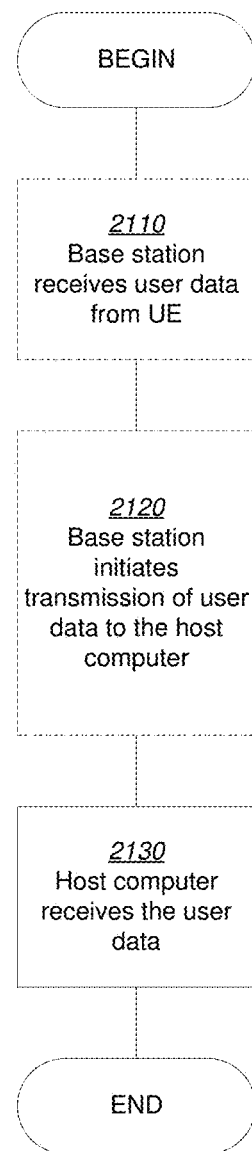

FIG. 21 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 21 will be included in this section. In an optional first step 2110 of the method, in accordance with the teachings of the embodiments described throughout this disclosure, the base station receives user data from the UE. In an optional second step 2120, the base station initiates transmission of the received user data to the host computer. In a third step 2130, the host computer receives the user data carried in the transmission initiated by the base station.

As discussed in detail above, the techniques described herein, e.g., as illustrated in the process flow diagrams of FIGS. 7 and 10-11, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 22:
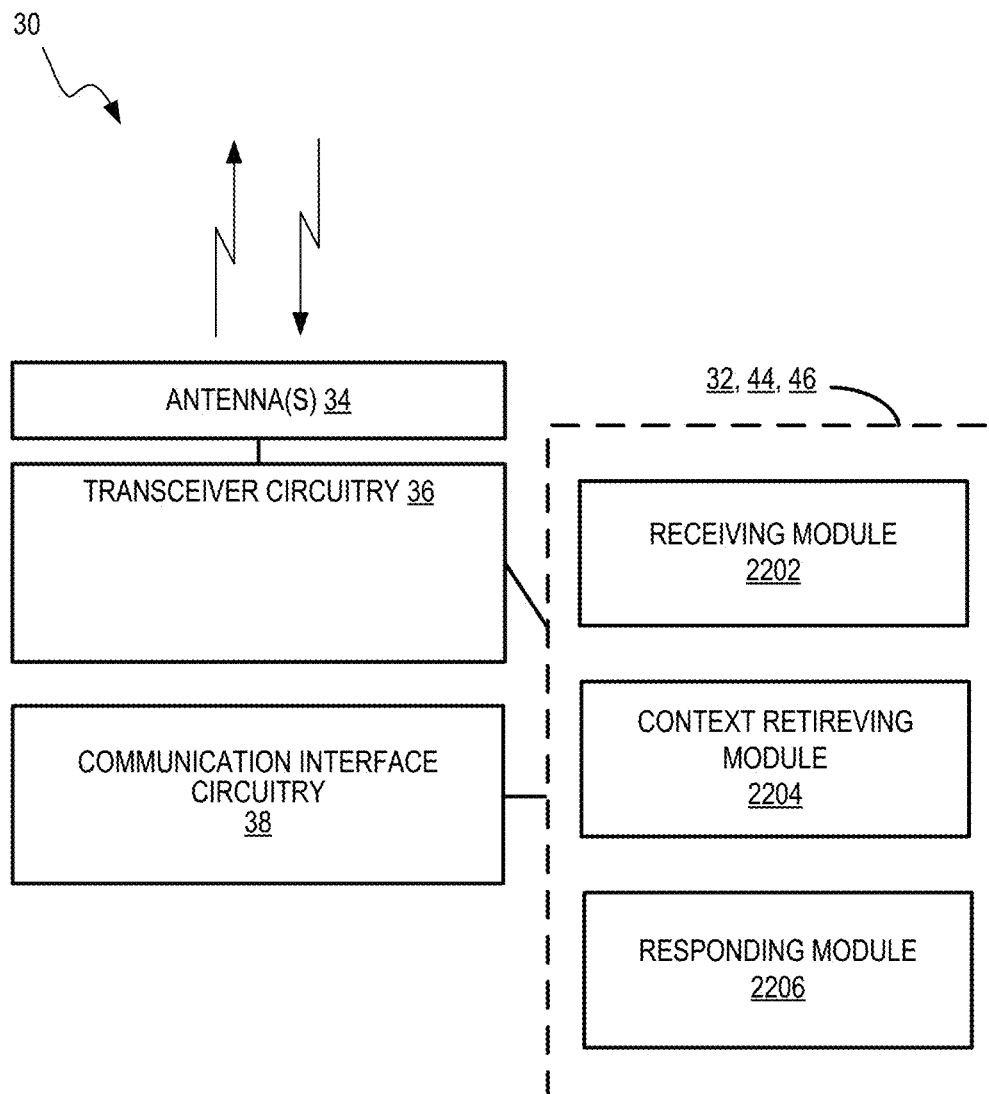
FIG. 22 is a block diagram illustrating a functional representation of an example access network node.

FIG. 22 illustrates an example functional module or circuit architecture as may be implemented in an access network node 30. The implementation includes a receiving module 2202 for receiving, from a wireless device, an RRC Resume Request message, where the RRC Resume Request message includes a cause indicator indicating a mobility signaling as a cause for resuming an RRC Connected stat. The implementation also includes a context retrieving module 2204 for retrieving a context for the wireless device and a responding module 2206 for responding to the RRC Resume Request message with an RRC Resume message. The receiving module 2202 is also for receiving, in response to the RCC Resume message, an RRC Resume Complete message, the RRC Resume Complete message comprising or being combined with a TAU message.

Figure 23:
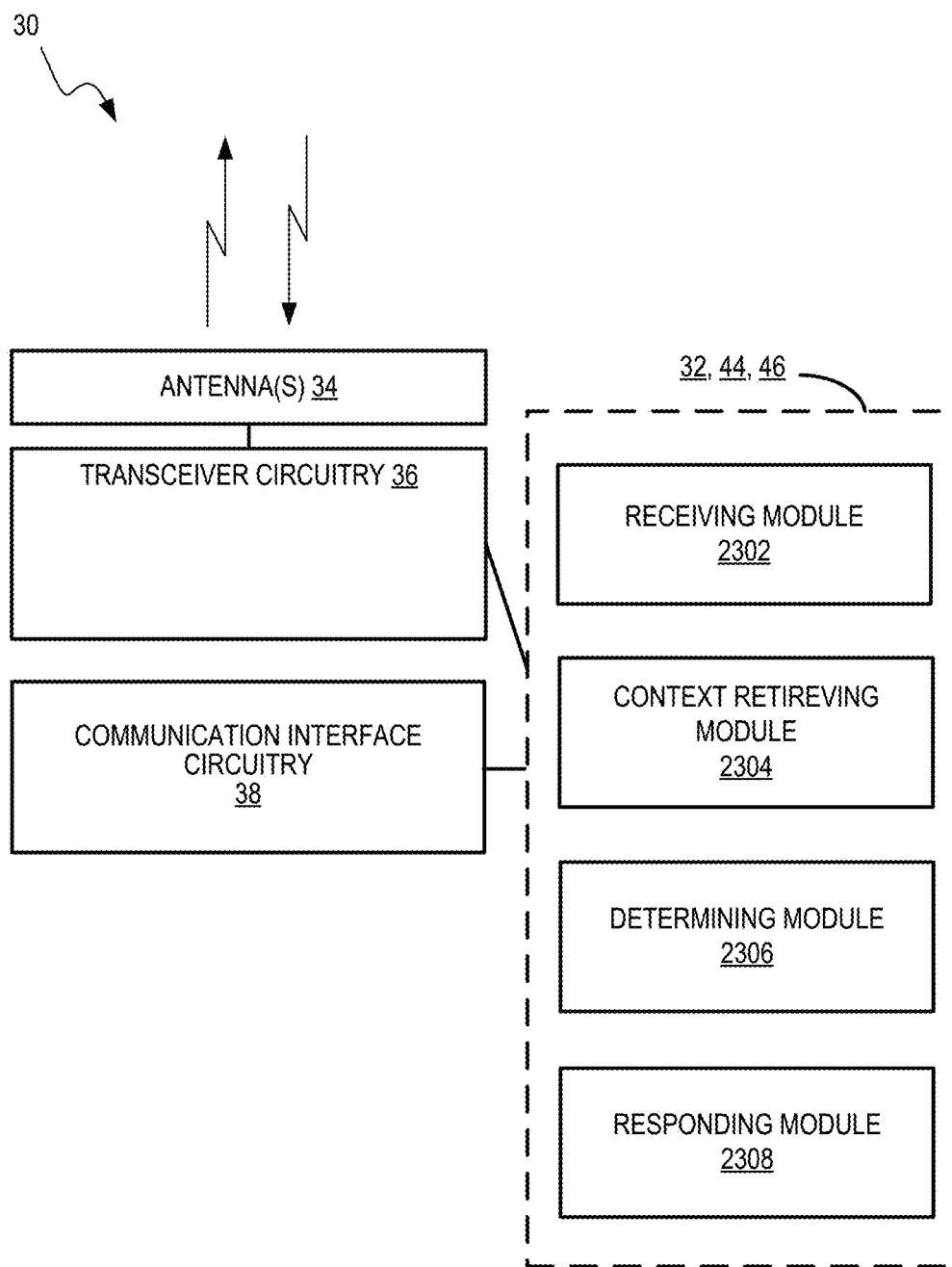
FIG. 23 is a block diagram illustrating a functional representation of an example wireless device.
Figure 24:
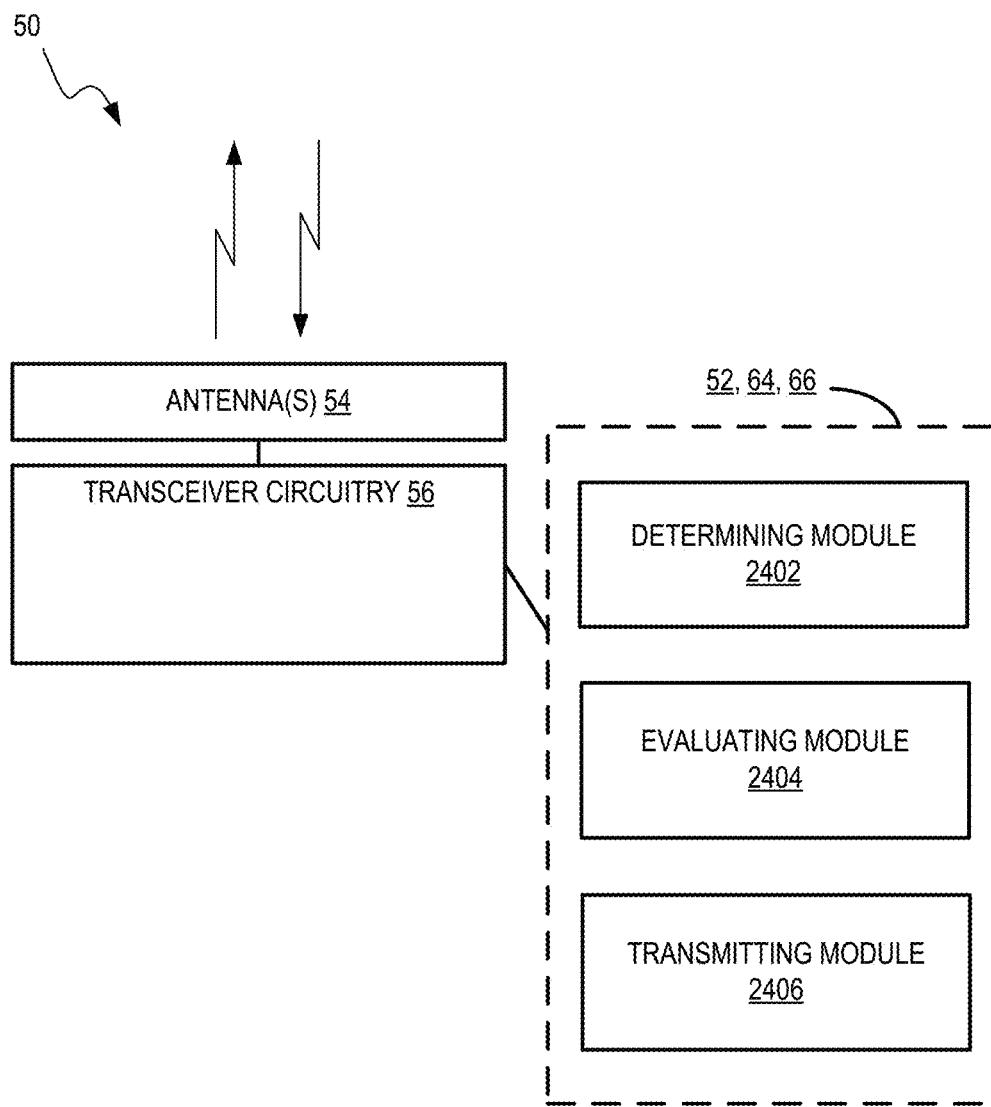
FIG. 24 illustrates an example functional module or circuit architecture as may be implemented in a wireless device.

FIG. 23 illustrates another example functional module or circuit architecture as may be implemented in an access network node 30. The implementation includes a receiving module 2202 for receiving, from a wireless device, a RRC Resume Request message, said RRC Resume Request message comprising a cause indicator indicating only an RNAU as a cause for resuming a RRC Connected state. The implementation may include a context retrieving module 2204 retrieving a context for the wireless device and a determining module 2206 for determining, based on the context, whether a TAC of the cell receiving the RRC Resume Request is represented in a TAI list for the wireless device. The implementation includes a responding module 2208 for selectively responding to the RRC Resume Request message with either a RRC Resume message, in the event that the TAC is not represented in the TAI list, or a RRC Suspend message, in the event that the TAC is represented in the TAI list. FIG. 24 illustrates an example functional module or circuit architecture as may be implemented in a wireless device 50. The implementation includes a determining module 2402 for determining, while in an RRC Inactive state, that an RNAU is needed. The implementation also includes an evaluating module 2404 for evaluating whether there is any other cause for resuming an RRC connected state, in addition to the need for the RNAU, and a transmitting module 2406 for transmitting a RRC Resume Request message to the network, in response to the determining, where the RRC Resume Request includes a cause indicator indicating an RNAU in the event that the evaluating identifies no other cause for resuming the RRC connected state.

Figure 25:
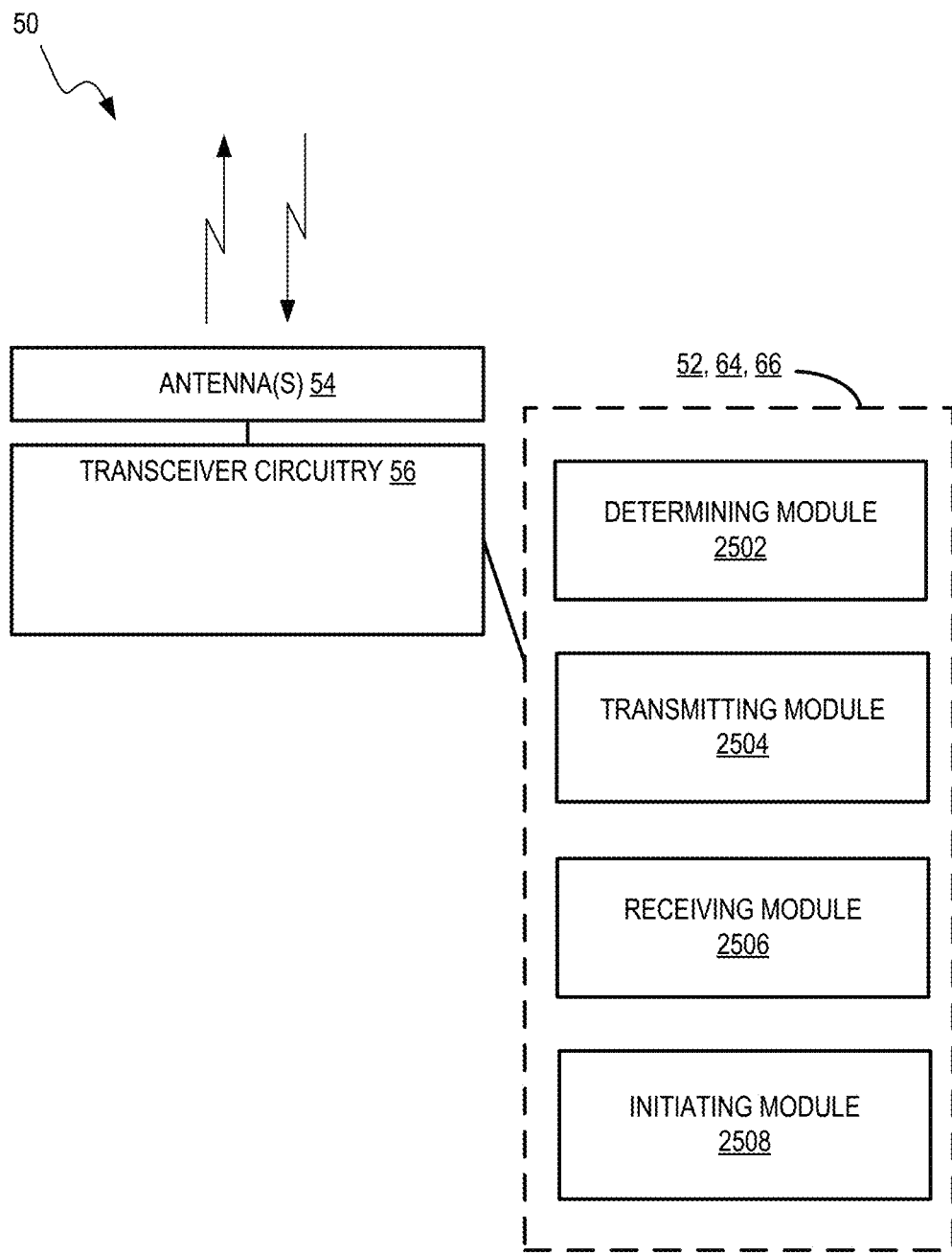
FIG. 25 illustrates another example functional module or circuit architecture as may be implemented in a wireless device.

FIG. 25 illustrates another example functional module or circuit architecture as may be implemented in a wireless device 50. The implementation includes a determining module 2502 for determining, while in an RRC Inactive state, that both an RNAU and a TAU are needed, and a transmitting module 2504 for transmitting a RRC Resume Request message to the network, in response to the determining, where the RRC Resume Request message includes a cause indicator indicating a mobility signaling as a cause for resuming a RRC Connected state. The implementation also includes a receiving module 2506 for receiving an RRC Resume message in response to the RRC Resume Request and an initiating module 2508 for initiating a TAU, in response to receiving the RRC Resume Request.

EXAMPLE EMBODIMENTS

Example embodiments of the techniques and apparatus described herein include, but are not limited to, the following enumerated examples:

1. A method in a wireless device operating in a wireless communication network, the method comprising:
  determining, while in a Radio Resource Control (RRC) Inactive state, that both a Radio Access Network Notification Area Update (RNAU) and a tracking area update (TAU) are needed; and
  transmitting a RRC Resume Request message to the network, in response to said determining, said RRC Resume Request message comprising a cause indicator indicating only an RNAU as a cause for resuming a RRC Connected state.

2. The method of example embodiment 1, the method further comprising:
  receiving a RRC Resume message in response to the RRC Resume Request; and
  sending a RRC Resume Complete message in response to the RRC Resume message, the RRC Resume Complete message comprising or being combined with a TAU message.

3. The method of example embodiment 2, further comprising:
    transitioning to RRC Connected state, in response to the RRC Resume message;
    receiving, subsequently to said transitioning to RRC Connected state, an RRC Connection Suspend message; and
    transitioning to RRC Inactive state, in response to the RRC Connection Suspend message.
4. The method of example embodiment 3, further comprising:
    receiving or transmitting user plane data from the wireless communication network, while in said RRC Connected state.
5. The method of example embodiment 3, further comprising:
    responding to a received paging message, while in said RRC Connected state.
6. The method of example embodiment 1, the method further comprising:
    receiving a RRC Connection Suspend message in response to the RRC Resume Request, without receiving an intervening RRC Resume message; and
    transitioning to or remaining in the RRC Inactive state, without performing a TAU procedure.
7. The method of example embodiment 6, the method further comprising:
    determining, subsequently to receiving the RRC Connection Suspend message, that a TAU is needed; and, in response,
    initiating a TAU procedure by transmitting a second RRC Resume Request message to the network, said second RRC Resume Request message comprising a cause indicator indicating mobility signaling as the cause for resuming the RRC Connected state.
8. A method in a wireless device operating in a wireless communication network, the method comprising:
    determining, while in a Radio Resource Control (RRC) Inactive state, that an Radio Access Network Notification Area Update (RNAU) is needed;
    transmitting a RRC Resume Request message to the network, in response to said determining, said RRC Resume Request message comprising a cause indicator indicating only an RNAU as a cause for resuming a RRC Connected state;
    receiving a RRC Resume message in response to the RRC Resume Request; and
    initiating a tracking area update (TAU) in response to receiving the RRC Resume Request, without regard to whether network access stratum (NAS) functionality in the wireless device has determined a need for a TAU.
9. The method of example embodiment 8, wherein said initiating comprises:
    sending a RRC Resume Complete message in response to the RRC Resume message, the RRC Resume Complete message comprising or being combined with a TAU message
10. A method in a wireless device operating in a wireless communication network, the method comprising:
    determining, while in a Radio Resource Control (RRC) Inactive state, that both a Radio Access Network Notification Area Update (RNAU) and a tracking area update (TAU) are needed;
    transmitting a RRC Resume Request message to the network, in response to said determining, said RRC Resume Request message comprising a cause indicator indicating only a mobility signaling as a cause for resuming a RRC Connected state;
    receiving a RRC Resume message in response to the RRC Resume Request; and
    initiating a tracking area update (TAU) in response to receiving the RRC Resume Request.
11. A method in a wireless device operating in a wireless communication network, the method comprising:
    determining, while in a Radio Resource Control (RRC) Inactive state, that a Radio Access Network Notification Area Update (RNAU) is needed;
    evaluating whether there is any other cause for resuming a RRC connected state, in addition to the need for the RNAU; and
    transmitting a RRC Resume Request message to the network, in response to said determining, said RRC Resume Request message comprising a cause indicator, wherein said cause indicator indicates a RNAU only in the event that said evaluating identifies no other cause for resuming the RRC connected state.
12. The method of example embodiment 11, wherein evaluating whether there is any other cause for resuming the RRC connected state comprises determining that a tracking area update (TAU) is needed, and wherein the cause indicator indicates mobility signaling as the cause for resuming the RRC connected state.
13. The method of example embodiment 11, wherein evaluating whether there is any other cause for resuming the RRC connected state comprises determining whether there is any uplink data in the wireless device's buffer and determining whether the wireless device needs to respond to a paging message.
14. A method, in an access network node of a wireless communication system, the method comprising:
    receiving, from a wireless device, a RRC Resume Request message, said RRC Resume Request message comprising a cause indicator indicating only a radio access network notification update (RNAU) as a cause for resuming a RRC Connected state;
    retrieving a context for the wireless device;
    determining, based on the context, whether a tracking area code (TAC) of the cell receiving the RRC Resume Request is represented in a tracking area identifier (TAI) list for the wireless device; and
    selectively responding to the RRC Resume Request message with either a RRC Resume message, in the event that the TAC is not represented in the TAI list, or a RRC Suspend message, in the event that the TAC is represented in the TAI list.
15. The method of example embodiment 14, wherein the TAC is represented in the TAI list, and wherein the RRC Suspend message includes information configuring the wireless device with a new radio access network notification area (RNA).
16. The method of example embodiment 15, wherein the TAC is not represented in the TAI list, and wherein the method further comprises receiving, in response to the RCC Resume message, an RRC Resume Complete message, the RRC Resume Complete message comprising or being combined with a tracking area update (TAU) message.
17. A method, in an access network node of a wireless communication system, the method comprising:
    receiving, from a wireless device, a RRC Resume Request message, said RRC Resume Request message comprising a cause indicator indicating only a mobility signaling as a cause for resuming a RRC Connected state;

retrieving a context for the wireless device;
responding to the RRC Resume Request message with a RRC Resume message; and
receiving, in response to the RCC Resume message, an RRC Resume Complete message, the RRC Resume Complete message comprising or being combined with a tracking area update (TAU) message.

18. The method of example embodiment 17, further comprising determining, in response to the RRC Resume Request message, whether to change UE context parameters or whether to move the wireless device to RRC Inactive state without waiting for an RRC inactivity timer for the wireless device to expire.

19. A wireless device adapted to perform the methods of any of example embodiments 1-13.

20. An access network node adapted to perform the methods of any of example embodiments 14-18.

21. A computer program comprising instructions that, when executed on at least one processing circuit, cause the at least one processing circuit to carry out the method according to any one of example embodiments 1-18.

22. A carrier containing the computer program of example embodiment 21, wherein the carrier is one of an electronic signal, optical signal, radio signal, or computer readable storage medium.

23. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs a method that comprises:
      receiving, from the UE, a RRC Resume Request message, said RRC Resume Request message comprising a cause indicator indicating only a radio access network notification update (RNAU) as a cause for resuming a RRC Connected state;
      retrieving a context for the UE;
      determining, based on the context, whether a tracking area code (TAC) of the cell receiving the RRC Resume Request is represented in a tracking area identifier (TAI) list for the UE; and
      selectively responding to the RRC Resume Request message with either a RRC Resume message, in the event that the TAC is not represented in the TAI list, or a RRC Suspend message, in the event that the TAC is represented in the TAI list.

24. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs a method that comprises:
      receiving, from the UE, a RRC Resume Request message, said RRC Resume Request message comprising a cause indicator indicating only a mobility signaling as a cause for resuming a RRC Connected state;
      retrieving a context for the UE;
      responding to the RRC Resume Request message with a RRC Resume message; and
      receiving, in response to the RCC Resume message, an RRC Resume Complete message, the RRC Resume Complete message comprising or being combined with a tracking area update (TAU) message.

25. The method of example embodiments 24 or 25, further comprising:
   at the base station, transmitting the user data.

26. The method of example embodiment 25, wherein the user data is provided at the host computer by executing a host application,
   the method further comprising:
      at the UE, executing a client application associated with the host application.

27. A method implemented in a communication system including a host computer, a base station, and a user equipment (UE), the method comprising:
   at the host computer, receiving, from the base station, user data originating from a transmission which the base station has received from the UE, wherein the base station performs a method that comprises:
      receiving, from the UE, a RRC Resume Request message, said RRC Resume Request message comprising a cause indicator indicating only a radio access network notification update (RNAU) as a cause for resuming a RRC Connected state;
      retrieving a context for the UE;
      determining, based on the context, whether a tracking area code (TAC) of the cell receiving the RRC Resume Request is represented in a tracking area identifier (TAI) list for the UE; and
      selectively responding to the RRC Resume Request message with either a RRC Resume message, in the event that the TAC is not represented in the TAI list, or a RRC Suspend message, in the event that the TAC is represented in the TAI list.

28. A method implemented in a communication system including a host computer, a base station, and a user equipment (UE), the method comprising:
   at the host computer, receiving, from the base station, user data originating from a transmission which the base station has received from the UE, wherein the base station performs a method that comprises:
      receiving, from the UE, a RRC Resume Request message, said RRC Resume Request message comprising a cause indicator indicating only a mobility signaling as a cause for resuming a RRC Connected state;
      retrieving a context for the UE;
      responding to the RRC Resume Request message with a RRC Resume message; and
      receiving, in response to the RCC Resume message, an RRC Resume Complete message, the RRC Resume Complete message comprising or being combined with a tracking area update (TAU) message.

29. The method of example embodiment 27 or 28, further comprising:
   at the base station, receiving the user data from the UE.

30. The method of example embodiment 29, further comprising:
   at the base station, initiating a transmission of the received user data to the host computer.

31. A communication system including a host computer comprising:
   processing circuitry configured to provide user data; and
   a communication interface configured to forward the user data to a cellular network for transmission to a user equipment (UE), wherein the cellular network comprises a base station having communication circuitry and processing circuitry, the base station's processing circuitry configured to:
receive, from the UE, a RRC Resume Request message, said RRC Resume Request message comprising a cause indicator indicating only a radio access network notification update (RNAU) as a cause for resuming a RRC Connected state;
retrieve a context for the UE;
determine, based on the context, whether a tracking area code (TAC) of the cell receiving the RRC Resume Request is represented in a tracking area identifier (TAI) list for the UE; and
selectively respond to the RRC Resume Request message with either a RRC Resume message, in the event that the TAC is not represented in the TAI list, or a RRC Suspend message, in the event that the TAC is represented in the TAI list.

32. A communication system including a host computer comprising:
processing circuitry configured to provide user data; and
a communication interface configured to forward the user data to a cellular network for transmission to a user equipment (UE),
wherein the cellular network comprises a base station having communication circuitry and processing circuitry, the base station's processing circuitry configured to:
receive, from the UE, a RRC Resume Request message, said RRC Resume Request message comprising a cause indicator indicating only a mobility signaling as a cause for resuming a RRC Connected state;
retrieve a context for the UE;
respond to the RRC Resume Request message with a RRC Resume message; and receive, in response to the RCC Resume message, an RRC Resume Complete message, the RRC Resume Complete message comprising or being combined with a tracking area update (TAU) message.

33. The communication system of example embodiment 31 or 32, further including the base station.

34. The communication system of any of example embodiments 31-33, further including the UE, wherein the UE is configured to communicate with the base station.

35. The communication system of any of example embodiments 31-34, wherein:
the processing circuitry of the host computer is configured to execute a host application, thereby providing the user data; and
the UE comprises processing circuitry configured to execute a client application associated with the host application.

36. A communication system including a host computer comprising a communication interface configured to receive user data originating from a transmission from a user equipment (UE) to a base station and comprises a radio interface and processing circuitry, the base station's processing circuitry configured to:
receive, from the UE, a RRC Resume Request message, said RRC Resume Request message comprising a cause indicator indicating only a radio access network notification update (RNAU) as a cause for resuming a RRC Connected state;
retrieve a context for the UE;
determine, based on the context, whether a tracking area code (TAC) of the cell receiving the RRC Resume Request is represented in a tracking area identifier (TAI) list for the UE; and
selectively respond to the RRC Resume Request message with either a RRC Resume message, in the event that the TAC is not represented in the TAI list, or a RRC Suspend message, in the event that the TAC is represented in the TAI list.

37. A communication system including a host computer comprising a communication interface configured to receive user data originating from a transmission from a user equipment (UE) to a base station and comprises a radio interface and processing circuitry, the base station's processing circuitry configured to:
receive, from the UE, a RRC Resume Request message, said RRC Resume Request message comprising a cause indicator indicating only a mobility signaling as a cause for resuming a RRC Connected state;
retrieve a context for the UE;
respond to the RRC Resume Request message with a RRC Resume message; and
receive, in response to the RCC Resume message, an RRC Resume Complete message, the RRC Resume Complete message comprising or being combined with a tracking area update (TAU) message.

38. The communication system of example embodiment 36 or 37, further including the base station.

39. The communication system of any of example embodiments 36-38, further including the UE, wherein the UE is configured to communicate with the base station.

40. The communication system of any of example embodiments 36-39, wherein:
the host computer comprises processing circuitry configured to execute a host application; and
the UE is configured to execute a client application associated with the host application, thereby providing the user data to be received by the host computer.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method in a wireless device, the method comprising:
while the wireless device is in a Radio Resource Control (RRC) inactive state with respect to a wireless communication network, determining that a Radio Access Network Notification Area Update (RNAU) is needed;
evaluating whether there is any cause, other than the determined need for the RNAU, for resuming an RRC connected state with the wireless communication network; and
transmitting, to the wireless communication network, an RRC Resume Request message comprising a cause indicator indicating a cause for resuming the RRC connected state, wherein the cause indicator indicates:
an RNAU, when there is no cause for resuming the RRC connected state other than the determined need for the RNAU; and a cause other than an RNAU, when there is any cause for resuming the RRC connected state other than the determined need for the RNAU.

2. The method of claim 1, wherein determining that an RNAU is needed comprises performing a cell-reselection to a cell not belonging to a Radio Access Network Notification Area (RNA) configured for the wireless device.

3. The method of claim 1, wherein:
the method further comprises determining, while the wireless device is in the RRC inactive state, whether a tracking area update (TAU) is needed; and
when it is determined that a TAU is needed, the cause indicator indicates mobility signaling as the cause for resuming the RRC connected state.

4. The method of claim 1, wherein evaluating whether there is any cause, other than the determined need for the RNAU, for resuming the RRC connected state comprises:
determining whether there is any uplink data in the wireless device's buffer, and
determining whether the wireless device needs to respond to a paging message.

5. A wireless device comprising:
transceiver circuitry configured to transmit and receive signals with a wireless communication network according to a radio access technology; and
processing circuitry operatively coupled to the transceiver circuitry, whereby the processing circuitry and the transceiver circuitry are configured to:
while the wireless device is in a Radio Resource Control (RRC) inactive state with respect to the wireless communication network, determine that a Radio Access Network Notification Area Update (RNAU) is needed;
evaluate whether there is any cause, other than the determined need for the RNAU, for resuming an RRC connected state with the wireless communication network; and
transmit, to the wireless communication network, an RRC Resume Request message comprising a cause indicator indicating a cause for resuming the RRC connected state, wherein the cause indicator indicates:
an RNAU, when there is no cause for resuming the RRC connected state other than the determined need for the RNAU; and
a cause other than an RNAU, when there is any cause for resuming the RRC connected state other than the determined need for the RNAU.

6. The wireless device of claim 5, wherein the processing circuitry is configured to determine that an RNAU is needed based on performing a cell-reselection to a cell not belonging to a Radio Access Network Notification Area (RNA) configured for the wireless device.

7. The wireless device of claim 5, wherein:
the processing circuitry is further configured to determine, while the wireless device is in the RRC inactive state, whether a tracking area update (TAU) is needed; and
when it is determined that a TAU is needed, the cause indicator indicates mobility signaling as the cause for resuming the RRC connected state.

8. The wireless device of claim 5, wherein the processing circuitry is configured to evaluate whether there is any cause, other than the determined need for the RNAU, for resuming the RRC connected state based on:
determining whether there is any uplink data in the wireless device's buffer, and
determining whether the wireless device needs to respond to a paging message.

9. A non-transitory, computer-readable medium storing computer-executable instructions that, when executed by processing circuitry, configure a wireless device to:
while the wireless device is in a Radio Resource Control (RRC) inactive state with respect to a wireless communication network, determine that a Radio Access Network Notification Area Update (RNAU) is needed;
evaluate whether there is any cause, other than the determined need for the RNAU, for resuming an RRC connected state with the wireless communication network; and
transmit, to the wireless communication network, an RRC Resume Request message comprising a cause indicator indicating a cause for resuming the RRC connected state, wherein the cause indicator indicates:
an RNAU, when there is no cause for resuming the RRC connected state other than the determined need for the RNAU; and
a cause other than an RNAU, when there is any cause for resuming the RRC connected state other than the determined need for the RNAU.

10. The non-transitory, computer-readable medium of claim 9, wherein execution of the instructions configures the wireless device to determine that an RNAU is needed based on performing a cell-reselection to a cell not belonging to a Radio Access Network Notification Area (RNA) configured for the wireless device.

11. The non-transitory, computer-readable medium of claim 9, wherein:
execution of the instructions further configures the wireless device to determine, while the wireless device is in the RRC inactive state, whether a tracking area update (TAU) is needed; and
when it is determined that a TAU is needed, the cause indicator indicates mobility signaling as the cause for resuming the RRC connected state.

12. The non-transitory, computer-readable medium of claim 9, wherein execution of the instructions configures the wireless device to evaluate whether there is any cause, other than the determined need for the RNAU, for resuming the RRC connected state based on:
determining whether there is any uplink data in the wireless device's buffer, and
determining whether the wireless device needs to respond to a paging message.

* * * * *

UNITED STATES PATENT AND TRADEMARK OFFICE
CERTIFICATE OF CORRECTION

PATENT NO. : 11,765,783 B2
APPLICATION NO. : 17/526255
DATED : September 19, 2023
INVENTOR(S) : Lindheimer et al.

It is certified that error appears in the above-identified patent and that said Letters Patent is hereby corrected as shown below:

On the Title Page

On Page 2, in Item (56), under "OTHER PUBLICATIONS", in Column 2, Line 30, delete "Tdoe" and insert -- Tdoc --, therefor.

On Page 2, in Item (56), under "OTHER PUBLICATIONS", in Column 2, Line 30, delete "USA,," and insert -- USA, --, therefor.

In the Drawings

In Fig. 7A, Sheet 7 of 27, and on the Title Page, the illustrative print figure, Tag "702", Lines 3-4, delete "RADIO ACCESS NETWORK NOTIFICATION UPDATE (RNAU)" and insert -- RADIO ACCESS NETWORK NOTIFICATION AREA UPDATE (RNAU) --, therefor.

In Fig. 7C, Sheet 9 of 27, Tag "722", Lines 3-4, delete "RADIO ACCESS NETWORK NOTIFICATION UPDATE (RNAU)" and insert -- RADIO ACCESS NETWORK NOTIFICATION AREA UPDATE (RNAU) --, therefor.

In Fig. 22, Sheet 24 of 27, Tag "2204", Line 1, delete "RETIREVING" and insert -- RETRIEVING --, therefor.

In Fig. 23, Sheet 25 of 27, Tag "2304", Line 1, delete "RETIREVING" and insert -- RETRIEVING --, therefor.

In the Specification

In Column 1, Line 9, delete "2019," and insert -- 2019, now Pat. No. 11,219,084, --, therefor.

In Column 1, Line 34, delete "Connection management (CM)" and insert -- Connection Management (CM) --, therefor.

Signed and Sealed this
Nineteenth Day of March, 2024

Katherine Kelly Vidal
*Director of the United States Patent and Trademark Office*

In Column 3, Line 35, delete "(TA)'s." and insert -- (TAs). --, therefor.

In Column 5, Line 17, delete "TA's" and insert -- TAs --, therefor.

In Column 6, Line 58, delete "TA's," and insert -- TAs, --, therefor.

In Column 7, Line 50, delete "Tthe" and insert -- the --, therefor.

In Column 7, Line 51, delete "of if" and insert -- of --, therefor.

In Column 7, Line 52, delete "of for" and insert -- for --, therefor.

In Column 8, Line 1, delete "and RRC" and insert -- an RRC --, therefor.

In Column 8, Line 22, delete "configured" and insert -- is configured --, therefor.

In Column 8, Line 42, delete "because lif" and insert -- because if --, therefor.

In Column 8, Line 46, delete "variant. the" and insert -- variant, the --, therefor.

In Column 9, Line 2, delete "of of" and insert -- of --, therefor.

In Column 9, Line 11, delete "provide" and insert -- be provided --, therefor.

In Column 9, Line 24, delete "Similar" and insert -- Similarly --, therefor.

In Column 9, Line 29, delete "form" and insert -- from --, therefor.

In Column 11, Line 26, delete "FIG. 18-21" and insert -- FIGS. 18-21 --, therefor.

In Column 11, Line 57, delete "terms" and insert -- term --, therefor.

In Column 12, Line 7, delete "in above" and insert -- above --, therefor.

In Column 12, Line 8, delete "RNAU.)" and insert -- RNAU). --, therefor.

In Column 16, Line 8, delete "Request" and insert -- Request. --, therefor.

In Column 19, Lines 2-4, delete "1> if the UE is resuming an RRC connection:
start timer T300;
if the UE is resuming an RRC connection:" and
insert -- . . .
start timer T300;
if the UE is resuming an RRC connection: --, therefor.

CERTIFICATE OF CORRECTION (continued)
U.S. Pat. No. 11,765,783 B2

In Column 19, Lines 16-19, delete "1> if the UE receives from…… update:" and
insert -- . . .
if the UE receives from…… update: --, therefor.

In Column 19, Lines 24-25, delete "The UE shall submit…… layers for transmission." and
insert -- . . .
The UE shall submit…… layers for transmission. --, therefor.

In Column 19, Line 36, delete "1> enter RRC_CONNECTED;" and
insert -- . . .
enter RRC_CONNECTED; --, therefor.

In Column 19, Lines 39-40, delete "1> set the content…… message as follows:" and
insert -- . . .
set the content…… message as follows:
. . . --, therefor.

In Column 19, Lines 44-45, delete "1> submit…… to lower layers for transmission;" and
insert -- . . .
submit…… to lower layers for transmission; --, therefor.

In Column 19, Lines 50-53, delete "2> inform upper layers about the failure…… procedure ends;" and
insert -- . . .
inform upper layers about the failure…… procedure ends; --, therefor.

In Column 20, Line 40, delete "1> if the UE is resuming an RRC connection:" and
insert -- . . .
if the UE is resuming an RRC connection:
. . . --, therefor.

In Column 20, Lines 53-56, delete "1> if the UE receives from…… RNA update:" and
insert -- . . .
if the UE receives from…… RNA update: --, therefor.

In Column 20, Lines 62-63, delete "The UE shall submit the RRCConnectionResumeRequest message to lower layers for transmission." and
insert -- . . .
The UE shall submit the RRCConnectionResumeRequest message to lower layers for transmission. --, therefor.

In Column 21, Line 5, delete "1> enter RRC_CONNECTED;" and
insert -- . . .
enter RRC_CONNECTED; --, therefor.

In Column 21, Lines 8-9, delete "1> set the content of…… message as follows:" and insert -- . . .
set the content of…… message as follows:
. . . --, therefor.

In Column 21, Lines 13-14, delete "1> submit the…… to lower layers for transmission;" and insert -- . . .
submit the…… to lower layers for transmission; --, therefor.

In Column 21, Line 14, delete "1> the procedure ends." and insert the same on Line 15, before "5.3.3.6 T300 Expiry" as a new point.

In Column 21, Lines 18-21, delete "2> inform upper layers about…… procedure ends;" and insert -- . . .
inform upper layers about…… procedure ends; --, therefor.

In Column 21, Line 44, delete "an gNB-RAN," and insert -- a gNB-RAN, --, therefor.

In Column 23, Line 46, delete "use" and insert -- user --, therefor.

In Column 23, Line 50, delete "it may" and insert -- may --, therefor.

In Column 24, Line 24, delete "etc.; the" and insert -- etc. The --, therefor.

In Column 24, Line 34, delete "errors etc." and insert -- errors, etc. --, therefor.

In Column 25, Line 55, delete "stat." and insert -- state. --, therefor.

In Column 25, Lines 66-67, delete "receiving module 2202" and insert -- receiving module 2302 --, therefor.

In Column 26, Lines 4-5, delete "retrieving module 2204" and insert -- retrieving module 2304 --, therefor.

In Column 26, Line 6, delete "determining module 2206" and insert -- determining module 2306 --, therefor.

In Column 26, Lines 9-10, delete "responding module 2208" and insert -- responding module 2308 --, therefor.

In Column 27, Line 40, delete "an Radio" and insert -- a Radio --, therefor.

In Column 27, Line 51, delete "network access stratum (NAS)" and insert -- Non-Access-Stratum (NAS) --, therefor.

In Column 27, Line 58, delete "message" and insert -- message. --, therefor.

CERTIFICATE OF CORRECTION (continued)
U.S. Pat. No. 11,765,783 B2

In Column 28, Lines 38-39, delete "radio access network notification update (RNAU)" and insert -- radio access network notification area update (RNAU) --, therefor.

In Column 29, Lines 37-38, delete "radio access network notification update (RNAU)" and insert -- radio access network notification area update (RNAU) --, therefor.

In Column 30, Lines 22-23, delete "radio access network notification update (RNAU)" and insert -- radio access network notification area update (RNAU) --, therefor.

In Column 31, Lines 7-8, delete "radio access network notification update (RNAU)" and insert -- radio access network notification area update (RNAU) --, therefor.

In Column 31, Line 39, delete "receive, in response to" and insert the same on Line 40, before "the RCC Resume message," as a new sub-point.

In Column 31, Lines 65-66, delete "radio access network notification update (RNAU)" and insert -- radio access network notification area update (RNAU) --, therefor.